(12) United States Patent
Ide et al.

(10) Patent No.: US 11,646,646 B2
(45) Date of Patent: May 9, 2023

(54) METHOD OF MANUFACTURING WAVE WINDING COIL FOR ROTATING ELECTRICAL MACHINE

(71) Applicant: HONDA MOTOR CO., LTD., Tokyo (JP)

(72) Inventors: Takahiro Ide, Tochigi (JP); Akihiro Watanabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 17/211,802

(22) Filed: Mar. 24, 2021

(65) Prior Publication Data

US 2021/0305886 A1     Sep. 30, 2021

(30) Foreign Application Priority Data

Mar. 30, 2020  (JP) .............................. JP2020-059531

(51) Int. Cl.
    *H02K 15/04*  (2006.01)
    *H02K 1/16*   (2006.01)
    *H02K 3/12*   (2006.01)

(52) U.S. Cl.
    CPC .......... *H02K 15/0478* (2013.01); *H02K 1/16* (2013.01); *H02K 3/12* (2013.01)

(58) Field of Classification Search
    CPC ......... H02K 15/0478; H02K 1/16; H02K 3/12
    See application file for complete search history.

(56) References Cited

U.S. PATENT DOCUMENTS

| | | | | |
|---|---|---|---|---|
| 2002/0092152 A1* | 7/2002 | Asao | ........................ | H02K 3/50 |
| | | | | 29/598 |
| 2003/0034703 A1* | 2/2003 | Oohashi | .................. | F02N 11/04 |
| | | | | 310/68 B |
| 2006/0022547 A1* | 2/2006 | Sadiku | ............... | H02K 15/0478 |
| | | | | 310/180 |
| 2009/0134737 A1* | 5/2009 | Maekawa | ................ | H02K 3/28 |
| | | | | 310/207 |
| 2010/0077599 A1* | 4/2010 | Tokizawa | ........... | H02K 15/0478 |
| | | | | 29/596 |

(Continued)

FOREIGN PATENT DOCUMENTS

| | | |
|---|---|---|
| EP | 1331718 A1 | 7/2003 |
| JP | 2010104145 A | 5/2010 |

(Continued)

*Primary Examiner* — Peter Dungba Vo
*Assistant Examiner* — Jose K Abraham
(74) *Attorney, Agent, or Firm* — CKC & Partners Co., LLC

(57) ABSTRACT

The continuous wires respectively have U-shaped parts and straight parts. The method includes: a transposition shape forming step of forming transposition shapes in each of which, among at least the two continuous wires belonging to an identical phase, the U-shaped part of one of the continuous wires is disposed inside the U-shaped part of the other one of the continuous wires; an inclined part forming step of causing the pairs of straight parts of the continuous wires respectively formed with the transposition shapes to be offset to form inclined parts on the continuous wires; and a folding step of folding the continuous wires formed with the inclined parts to form the turning parts and the slot disposition parts. The inclined part forming step and the folding step are alternately performed.

3 Claims, 26 Drawing Sheets

(56) References Cited

U.S. PATENT DOCUMENTS

| | | | |
|---|---|---|---|
| 2010/0102681 A1 | 4/2010 | Koga et al. | |
| 2015/0091408 A1* | 4/2015 | Azusawa | H02K 3/12 |
| | | | 310/208 |
| 2016/0049841 A1* | 2/2016 | Brennvall | H02K 21/24 |
| | | | 310/208 |
| 2017/0033619 A1* | 2/2017 | Tamura | H02K 3/28 |
| 2018/0287445 A1* | 10/2018 | Ishizuka | H02K 1/16 |
| 2019/0260249 A1* | 8/2019 | Oka | H02K 3/14 |

FOREIGN PATENT DOCUMENTS

| | | | | |
|---|---|---|---|---|
| JP | 2017034847 A | 2/2017 | | |
| WO | WO-2019130232 A1 * | 7/2019 | | H02K 1/16 |

\* cited by examiner

METHOD OF MANUFACTURING WAVE WINDING COIL FOR ROTATING ELECTRICAL MACHINE

This application is based on and claims the benefit of priority from Japanese Patent Application 2020-059531, filed on 30 Mar. 2020, the content of which is incorporated herein by reference.

BACKGROUND OF THE INVENTION

Field of the Invention

The present invention relates to a method of manufacturing a wave winding coil, and a stator for a rotating electrical machine.

Related Art

Generally, wave winding coils are known as coils constituting stators for rotating electrical machines such as electric motors and electric generators. A wave winding coil has a plurality of straight-shaped, slot disposition parts disposed in slots of a stator core and a plurality of turning parts each coupling, on an outer side of the stator core in an axial direction, the slot disposition parts adjacent to each other in a projected shape or an arch shape. The wave winding coil is formed in a wave shape along the stator core in a circumferential direction.

As a wave winding coil, a coil formed from parallel winding wires, where three phases of a U phase, a V phase, and a W phase are configured, is known. However, if the parallel winding wires are each other not electrically balanced, a circulating current may occur, leading to a problem of an electrical loss.

To solve the problem of the occurrence of this circulating current, the technology described in Japanese Unexamined Patent Application, Publication No. 2017-34347 is known. The technology is created by using a U-shaped segment coil, where a turning part has a long-pitch turning part that is longer in an axial direction of a stator core and a short-pitch turning part that is shorter in the axial direction. In this technology, the short-pitch turning part is disposed to be accommodated inside the long-pitch turning part in the axial direction to allow the coil to be transposed to suppress a circulating current from occurring.

Patent Document 1: Japanese Unexamined Patent Application, Publication No. 2017-34847

SUMMARY OF THE INVENTION

However, in the technology described in Japanese Unexamined Patent Application, Publication No. 2017-34847 described above, an upper surface of the stator core is formed with transposition shapes where the coil is transposed, while a lower surface of the stator core is formed with non-transposition shapes where the coil is not transposed, to alternately form pluralities of the transposition shapes and the non-transposition shapes. Therefore, it is difficult to achieve a similar configuration with continuous wires that continue in a circumferential direction of a stator core, as it is necessary to change a folding method each time.

An object of the present invention is to provide a method of manufacturing a wave winding coil, and a stator for a rotating electrical machine, which includes the wave winding coil. The method makes it possible to easily form a transposed, wave winding coil with continuous wires, without the necessity of changing a folding method.

A first aspect of the present invention is directed to a method of manufacturing a wave winding coil (for example, a wave winding coil 1, described later) formed from continuous wires (for example, continuous wires 10, described later). The wave winding coil has a plurality of slot disposition parts (for example, slot disposition parts 11, described later) configured to be disposed in slots (for example, slots 23, described later) of a stator core (for example, a stator core 20, described later) and turning parts (for example, turning parts 12, described later) each coupling the slot disposition parts adjacent to each other. The continuous wires respectively have U-shaped parts (for example, U-shaped parts 12A, described later) each formed into a U-shape and pairs of straight parts (for example, straight parts 14, described later) extending from the U-shaped parts. The method includes: a transposition shape forming step of forming transposition shapes in each of which, among at least the two continuous wires belonging to an identical phase, the U-shaped part of one of the continuous wires is disposed inside the U-shaped part of the other one of the continuous wires; an inclined part forming step of causing the pairs of straight parts of the continuous wires respectively formed with the transposition shapes to be offset in a direction (for example, one of Y directions, described later) that intersects extending directions (for example, Z directions, described later) of the pairs of straight parts and that is orthogonal to thickness directions (for example, X directions, described later) of the U-shaped part to form inclined parts (for example, inclined parts 15, described later) on the continuous wires; and a folding step of folding the continuous wires respectively formed with the inclined parts, at portions of the inclined parts, the portions corresponding to apex parts (for example, apex parts 12c, described later) of the turning parts, to form the turning parts and the slot disposition parts. The inclined part forming step and the folding step are alternately performed.

According to the first aspect described above, forming a transposition shape only on a U-shaped part, which is formed into a U-shape, of a continuous wire makes it possible to easily form a transposed, wave winding coil, without the necessity of changing a folding method.

A second aspect of the present invention is an embodiment of the first aspect. In the method of manufacturing the wave winding coil according to the second aspect, the continuous wires may each be formed from at least two unit wire materials (for example, unit wire materials 10a, described later) that are present in the direction that intersects the extending directions of the pairs of straight parts and that is orthogonal to the thickness directions of the U-shaped parts. In the transposition shape forming step, the transposition shapes may be formed such that in each transposition shape, the U-shaped part of one of the unit wire materials of the continuous wires is disposed inside the U-shaped part of the other one of the unit wire materials.

According to the second aspect described above, forming each of continuous wires with at least two unit wire materials that are present in the direction that intersects the extending directions of the straight parts and that is orthogonal to the thickness directions of the U-shaped parts makes it possible to cause the unit wire materials constituting the continuous wires to be transposed in the U-shaped parts.

A third aspect of the present invention is an embodiment of the first or second aspect. In the method of manufacturing the wave winding coil according to the third aspect, the plurality of transposition shapes may be disposed in a stacked manner to dispose each of the pairs of straight parts of the continuous wires in an identical one of the slots. The inclined part forming step and the folding step may be alternately performed on the plurality of transposition shapes.

According to the third aspect described above, it is possible to form, in a single process, a wave winding coil having phases.

A fourth aspect of the present invention is an embodiment of the third aspect. In the method of manufacturing the wave winding coil according to the fourth aspect, the wave winding coil may be a wave winding coil where, when the wave winding coil is attached in a winding manner onto the stator core, a plurality of layers (for example, layers T, described later) corresponding to a plurality of turns on the stator core are configured. In the folding step, a folding direction of the inclined parts may be reversed at layer switching parts (for example, layer switching parts Ta, described later) where the layers each switch in a diameter direction of the stator core.

According to the fourth aspect described above, it is possible to form, in a single process, a wave winding coil corresponding to a plurality of turns without forming any steps on the layer switching parts.

A fifth aspect of the present invention is an embodiment of the fourth aspect. In the method of manufacturing the wave winding coil according to the fifth aspect, in the folding step, folding may take place to allow a slot pitch of the wave winding coil to be manufactured to be displaced and shortened by one slot at least one of the layer switching parts.

According to the fifth aspect described above, it is possible to easily cause a position at which a phase switches to be displaced, to reduce ripples, and to allow the rotating electrical machine to smoothly rotate.

A sixth aspect of the present invention is directed to a stator (for example, a stator 2, described later) for a rotating electrical machine. The stator includes a wave winding coil (for example, a wave winding coil 1, described later) formed from continuous wires (for example, continuous wires 10, described later), and a stator core (for example, a stator core 20, described later) having slots (for example, slots 23, described later) inserted with the wave winding coil. The wave winding coil has, per phase, a transposition shape in which, among at least two continuous wires respectively having U-shaped parts (for example, U-shaped parts 12A, described later) each formed into a U-shape, the U-shaped part of one of the continuous wires is disposed inside the U-shaped part of the other one of the continuous wires.

According to the sixth aspect described above, providing a transposition shape only on the U-shaped part formed into a U-shape makes it possible to easily acquire a stator for a rotating electrical machine, which includes a transposed, wave winding coil.

A seventh aspect of the present invention is an embodiment of the sixth aspect. In the stator according to the seventh aspect, the transposition shape may be disposed on a turning part (for example, a turning part 12, described later) on an outermost side or an innermost side in a diameter direction of the stator core.

According to the seventh aspect described above, it is possible to easily acquire a stator for a rotating electrical machine, onto which it is possible to easily dispose a transposed, wave winding coil.

According to the present invention, it is possible to provide a method of manufacturing a wave winding coil, and a stator for a rotating electrical machine, which includes the wave winding coil. The method makes it possible to easily form a transposed, wave winding coil with continuous wires, without the necessity of changing a folding method.

DETAILED DESCRIPTION OF THE INVENTION

Figure 1:
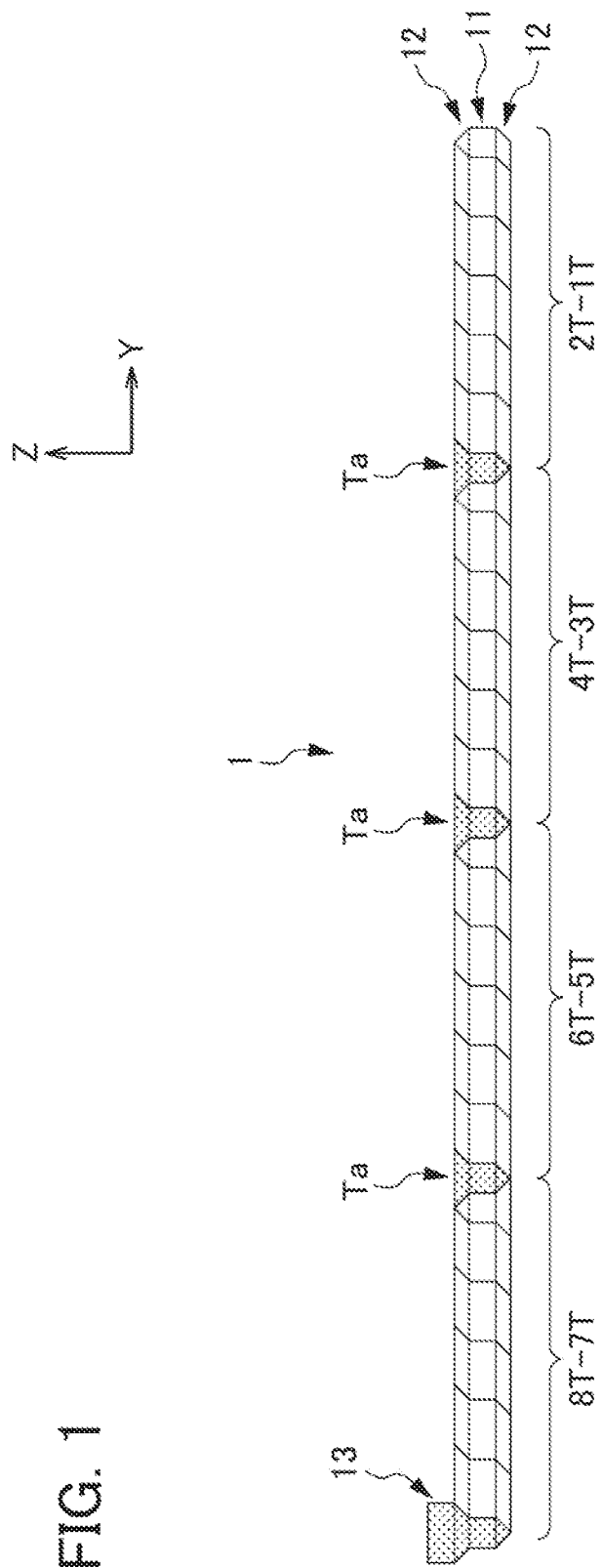
FIG. 1 is a front view schematically illustrating a wave winding coil.

An embodiment of a method of manufacturing a wave winding coil, according to the present invention, will now be described herein in detail with reference to the accompanying drawings. A wave winding coil and a stator will first be described with reference to FIGS. 1 and 2. A wave winding coil 1 according to the embodiment is formed, by using a plurality of continuous wires 10 arranged in parallel to each other, which will be described later, into an elongated sheet shape extending in Y directions in the drawings. The Y directions correspond to circumferential directions of a stator core 20 illustrated in FIG. 2.

A stator 2 includes the stator core 20 and the wave winding coil 1 attached to the stator core 20. The stator core 20 has a plurality of teeth 22 radially protruding toward a central axial hole 21. Slots 23 are each formed between the teeth 22 and 22 adjacent to each other. The embodiment exemplifies the stator core 20 having the 72 slots 23.

The wave winding coil 1 has a plurality of slot disposition parts 11 and a plurality of turning parts 12. The slot disposition parts 11 are portions disposed in the slots 23 of the stator core 20. The slot disposition parts 11 extend straightforwardly in axial directions (Z directions in FIG. 1) of the stator core 20. The turning parts 12 are portions coupling, on an outer side in the stator core 20 in the axial directions, the slot disposition parts 11 and 11 adjacent to each other of the continuous wires 10 in a projected shape or an arch shape. The wave winding coil 1 has, at one end, a terminal part 13 used for electrical coupling to a driving circuit. The slot disposition parts 11 and the turning parts 12 of the wave winding coil 1 are formed from the plurality of continuous wires 10. However, in FIG. 1, the slot disposition parts 11, the turning parts 12, and the terminal part 13 are schematically illustrated in a plane.

The wave winding coil 1 according to the embodiment has a length corresponding to four circumferential lengths of the stator core 20, constituting a coil having a total of eight layers T (eight turns) of 1T to 8T on the stator core 20. Therefore, the wave winding coil 1 constitutes a coil having two layers (two turns) per the one circumferential length of the stator core 20, where layer switching occurs each time the coil is wound around the stator core 20. Reference signs Ta illustrated in FIG. 1 indicate layer switching parts respectively disposed between the seventh layer (7T) and the sixth layer (6T), between the fifth layer (5T) and the fourth layer (4T), and between the third layer (3T) and the second layer (2T).

The wave winding coil 1 is spirally wound four times around the stator core 20. The slot disposition parts 11 are disposed in the slots 23 of the stator core 20. The wave winding coil 1 is thus attached to the stator core 20. Therefore, the stator 2 for a rotating electrical machine is configured. Note that, although insulating paper is disposed in each of the slots 23 for insulating purposes between the wave winding coil 1 and the stator core 20, the illustration of the insulating paper is omitted in FIG. 2.

Figure 3:
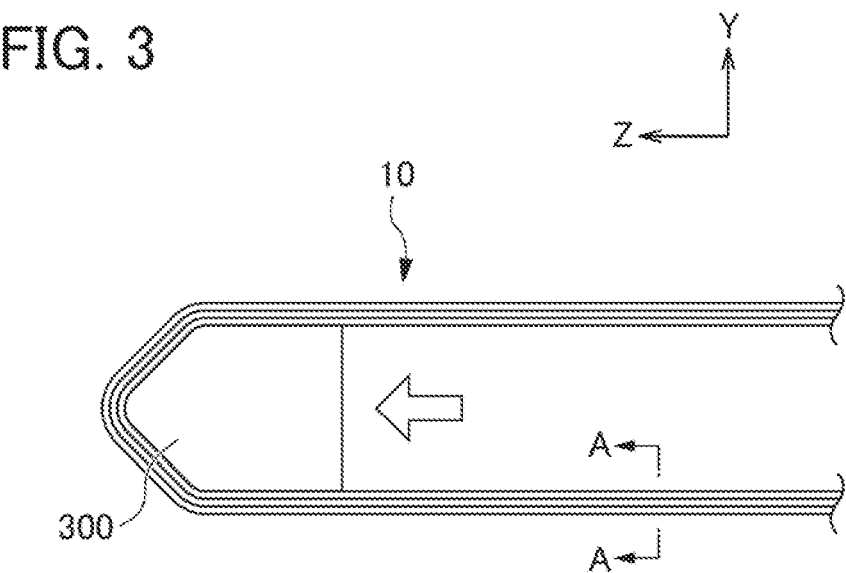
FIG. 3 is a view illustrating how a continuous wire is formed.
Figure 4:
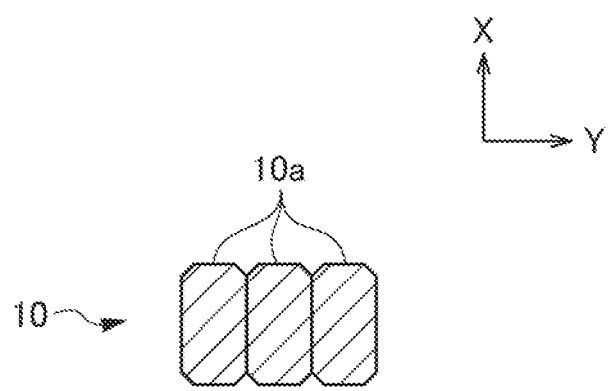
FIG. 4 is a cross-sectional view taken along line A-A in FIG. 3.

Next, each of the continuous wires 10 according to the embodiment, which constitutes the wave winding coil 1, will now be described with reference to FIGS. 3 to 6. The continuous wire 10 is an electrical conductor made from a copper wire, for example. The continuous wire 10 is a continuous wire extending over the whole length of 1T to 8T of the wave winding coil 1. The continuous wire 10 is first cut to have a predetermined length corresponding to the whole length of the wave winding coil 1, as illustrated in FIG. 3. The continuous wire 10 then undergoes bending at a substantially center part in extending directions of the continuous wire 10, with an extracting tool 300 that moves in a direction illustrated by a white hollow arrow. The continuous wire 10 according to the embodiment is formed where, as illustrated in FIG. 4, three unit wire materials 10a that are rectangular wires, are arranged in the Y directions corresponding to the circumferential directions of the stator core 20. The continuous wire 10 is integrally formed when the three unit wire materials 10a arranged in the Y directions undergo bending, with the extracting tool 300, in the arrangement directions of the three unit wire materials 10a.

Figure 5:
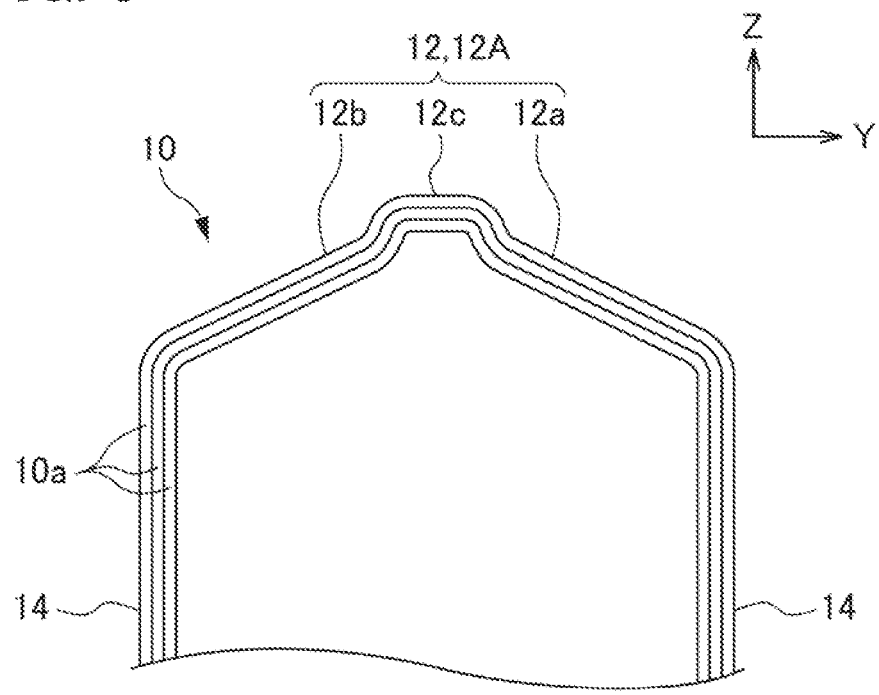
FIG. 5 is a front view illustrating in an enlarged manner a U-shaped part of the continuous wire.
Figure 6:
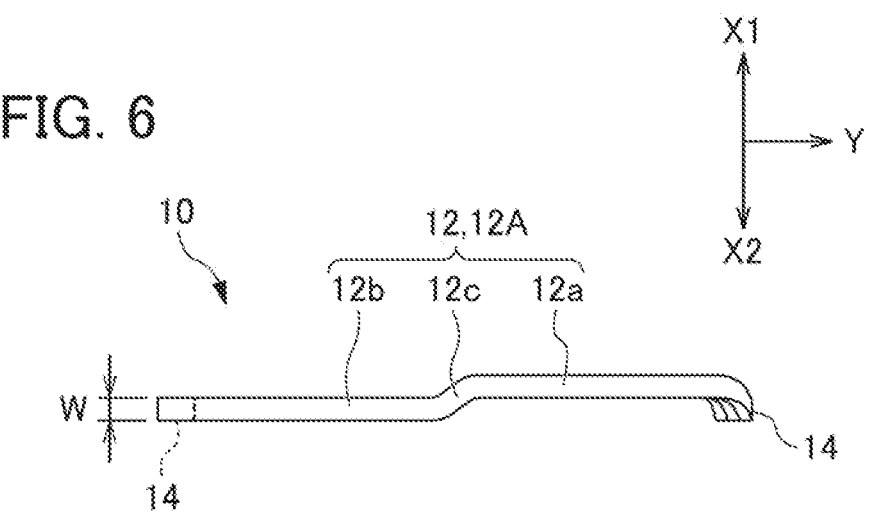
FIG. 6 is a view when the U-shaped part of the continuous wire illustrated in FIG. 5 is seen in a direction along Z directions.

The continuous wire 10 having undergone the bending with the extracting tool 300 is formed, with non-illustrated molds, as illustrated in FIGS. 5 and 6, into a U-shape having a U-shaped part 12A forming a projected shape and two straight parts 14 and 14 extending in parallel to each other in identical directions from both ends of the U-shaped part 12A. The U-shaped part 12A is also the turning part 12 first formed on the wave winding coil 1.

The U-shaped part 12A of the continuous wire 10 has, as illustrated in FIGS. 5 and 6, a first inclined part 12a, a second inclined part 12b, and an apex part 12c. The first inclined part 12a and the second inclined part 12b are respectively and integrally coupled to the straight parts 14 and 14. The first inclined part 12a and the second inclined part 12b respectively and obliquely extend, from coupling portions with the straight parts 14 and 14, in directions in which the first inclined part 12a and the second inclined part 12b come closer to each other. The first inclined part 12a and the second inclined part 12b are then further integrally coupled to the apex part 12c.

On the continuous wire 10 formed with the U-shaped part 12A, the unit wire materials 10a are stacked in parallel to each other in directions (the Y directions) that intersect the extending directions (the Z directions) of the straight parts 14 and that are orthogonal to thickness directions (X directions) of the U-shaped part 12A. When the U-shaped part 12A is to be formed on the continuous wire 10, one of the unit wire materials 10a is disposed, at the U-shaped part 12A, inside or outside the U-shape of another one of the unit wire materials 10a, as illustrated in FIG. 5. That is, the U-shaped part 12A of the continuous wire 10 is first folded along extending directions of each of the unit wire materials 10a, and then formed into a U-shape without changing a stacking order of the unit wire materials 10a. Therefore, the stacking order of the unit wire materials 10a in width directions of the continuous wire 10 is kept identical at the straight parts 14, the first inclined part 12a, the second inclined part 12b, and the apex part 12c.

When a thickness of the continuous wire 10 (a thickness of the stator core 20 in radial directions) is specified to W, as illustrated in FIG. 6, the second inclined part 12b is not offset in the X directions, with respect to the straight parts 14 to which the second inclined part 12b is coupled, but obliquely extends toward the apex part 12c. On the other hand, the first inclined part 12a is offset by W in an X1 direction with respect to the second inclined part 12b, and then obliquely extends toward the straight parts 14. That is, the first inclined part 12a is offset, at the coupling portion with one of the straight parts 14, by W in an X2 direction that is an opposite direction to the X1 direction described above. As a result, the two straight parts 14 and 14 do not change in position in the X directions. That is, the two straight parts 14 and 14 are disposed within a single plane extending in the Y directions. Note that the X directions indicated as the X1 direction and the X2 direction correspond to the radial directions of the stator core 20.

Figure 2:
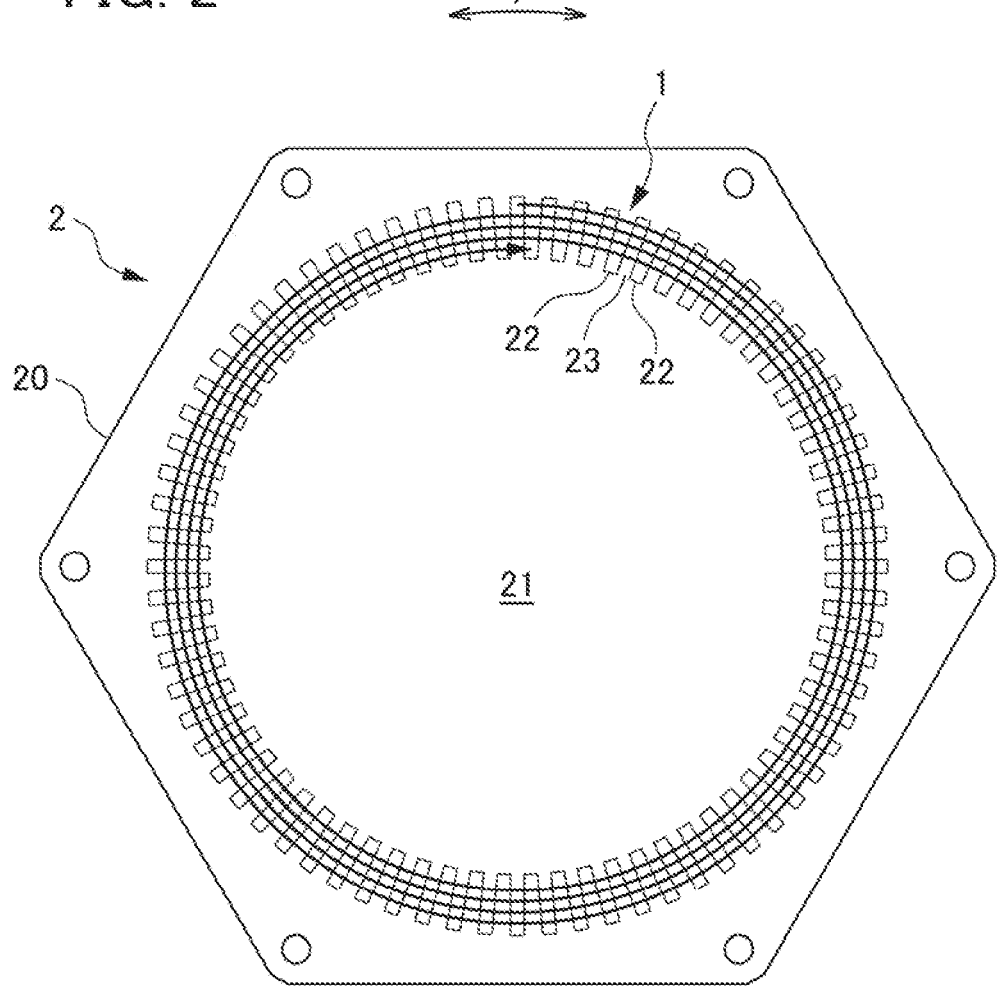
FIG. 2 is a plan view schematically illustrating a stator.
Figure 7:
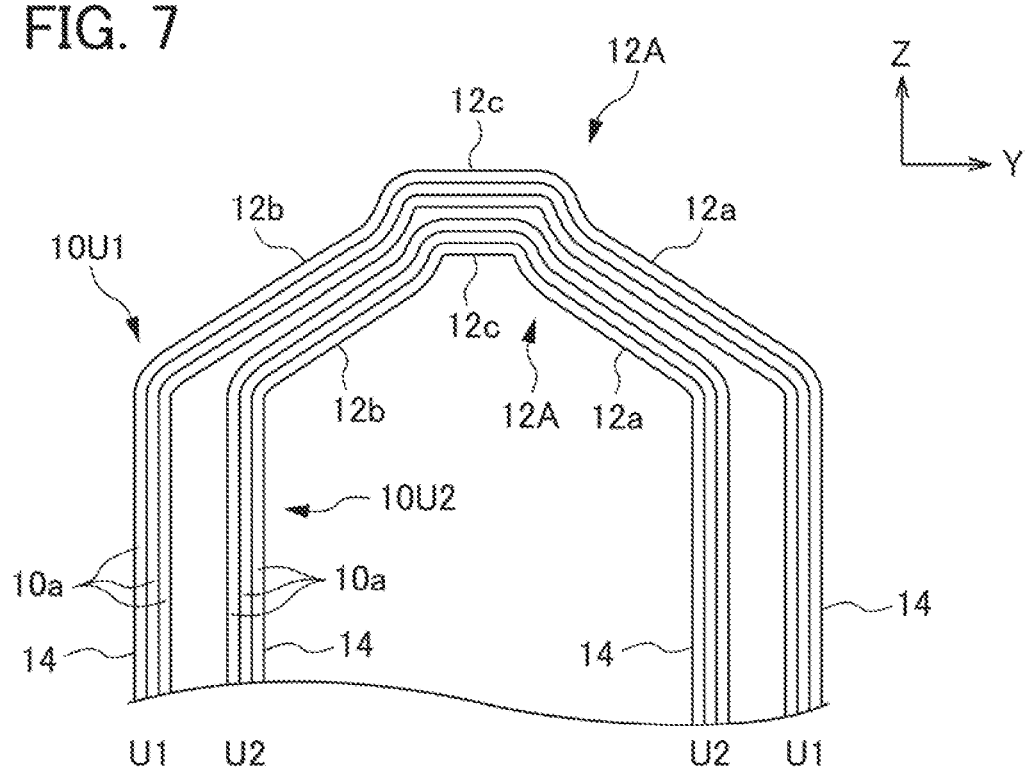
FIG. 7 is a front view illustrating a transposition shape formed when the two continuous wires illustrated in FIG. 5 are used.

The continuous wire 10 formed with the U-shape having the U-shaped part 12A belongs to one phase among the three phases of U, V and W. In the wave winding coil 1 according to the embodiment, the phases, each of which is disposed at two locations adjacent to each other, are alternately arranged in parallel to each other. That is, the two continuous wires 10 indicated as U1 and U2 belong to the U phase. The two continuous wires 10 indicated as V1 and V2 belong to the V phase. The two continuous wires 10 indicated as W1 and W2 belong to the W phase. Generally, in the wave winding coil 1, the phases are each disposed in a displaced manner by one slot in the circumferential directions (the Y directions) of the stator core 20. However, in an example of the two continuous wires 10U1 and 10U2 belonging to the U phase (U1 and U2) in the wave winding coil 1 according to the embodiment, as illustrated in FIG. 1, the U-shaped part 12A of one of the continuous wires 10, i.e., the continuous wire 10U2, is disposed inside the other one of the continuous wires 10, i.e., the continuous wire 10U1. Therefore, the U-shaped parts 12A and 12A of the two continuous wires 10U1 and 10U2 belonging to the U phase form a transposition shape. That is, when FIG. 7 is seen in one of the circumferential directions (the Y directions) of the stator core 20, i.e., from left to right in the drawing, a phase order is transposed from U1 and U2 to U2 and U1, via portions of the apex parts 12c and 12c (transposition shape forming step).

At this time, the four straight parts 14 of the continuous wires 10U1 and 10U2 are disposed within the single plane extending in the Y directions. Although the angles of the first inclined parts 12a and the second inclined parts 12b of the continuous wires 10U1 and 10U2 are substantially identical to each other, lengths of the first inclined part 12a and the second inclined part 12b of the continuous wire 10U2 are each shorter than lengths of the first inclined part 12a and the second inclined part 12b of the continuous wire 10U1.

An interval between the two straight parts 14 and 14 of the continuous wire 10U1 corresponds to an interval between two ones, which are separated from each other by seven slots, of the slots 23 and 23 of the stator core 20. That is, six ones of the slots 23 are disposed between the two straight parts 14 and 14 of the continuous wire 10U1. On the other hand, an interval between the two straight parts 14 and 14 of the continuous wire 10U2 corresponds to an interval between two ones, which are separated from each other by five slots, of the slots 23 and 23 of the stator core 20. That is, four ones of the slots 23 are disposed between the two straight parts 14 and 14 of the continuous wire 10U2. One of the straight parts 14 of the continuous wire 10U1 and one of the straight parts 14 of the continuous wire 10U2 are respectively accommodated within the slots 23 and 23 adjacent to each other. A width between the ones of the two straight parts 14 and 14 is set by adjusting a width of the extracting tool 300 (a width in the Y directions in FIG. 3) or by changing the extracting tool 300, when the U-shaped parts 12A are to be formed.

In the wave winding coil 1 according to the embodiment, the configuration of the two continuous wires 10U1 and 10U2 belonging to the U phase, as described above, is wholly and similarly applied to the V phase (V1 and V2) and the W phase (W1 and W2). Therefore, even in the V phase and the W phase, the continuous wires 10V1 and 10V2 and the continuous wires 10W1 and 10W2, where the U-shaped parts 12A have the transposition shapes, are formed.

Figure 8:
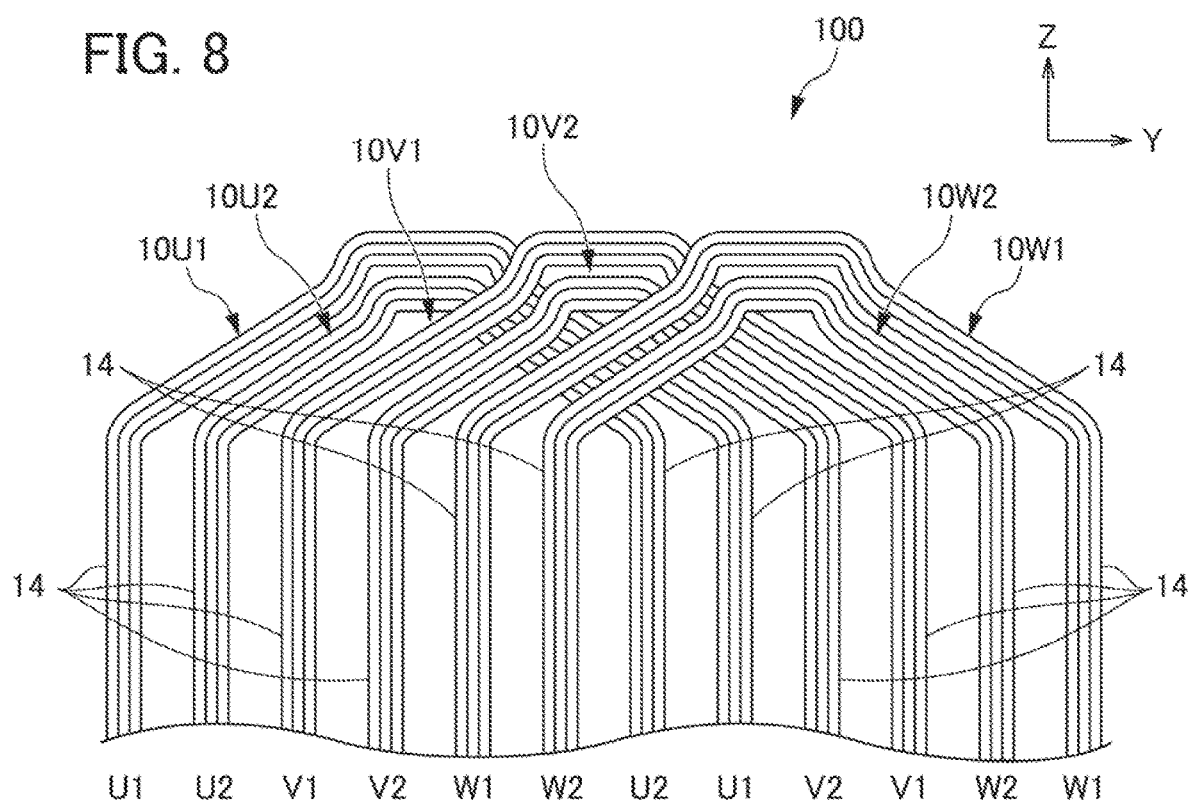
FIG. 8 is a front view illustrating in an enlarged manner the U-shaped parts of a group of the continuous wires configured when the plurality of continuous wires respectively having transposition shapes are arranged in parallel to each other.
Figure 9:
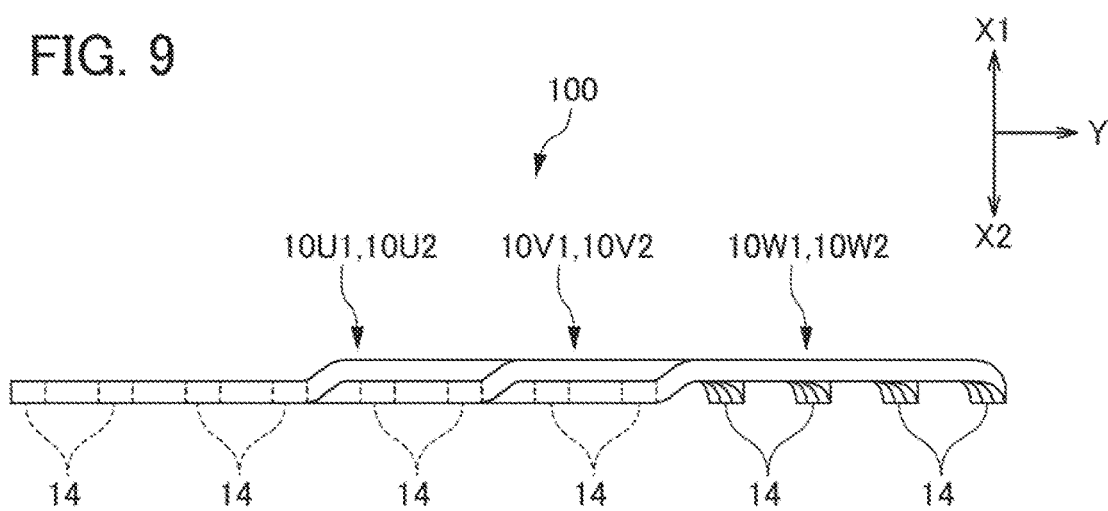
FIG. 9 is a view when the group of continuous wires illustrated in FIG. 8 are seen in the direction along the Z directions.

The total of the six continuous wires 10U1, 10U2, 10V1, 10V2, 10W1, and 10W2, where the two continuous wires 10 disposed inside and outside belong to each phase, are arranged in parallel to each other, when the wave winding coil 1 is to be formed, as illustrated in FIGS. 8 and 9. The six continuous wires 10 arranged in parallel to each other form a group of continuous wires 100. The 12 straight parts 14 are arranged in parallel to each other at constant intervals corresponding to slot intervals on the stator core 20. The first inclined part 12a and the second inclined part 12b of the U-shaped part 12A are offset by the thickness W of the continuous wire 10 in the opposite directions along the X directions. When the first inclined part 12a of one of the U-shaped parts 12A and 12A adjacent to each other and the second inclined part 12b of another one of the U-shaped parts 12A and 12A adjacent to each other are allowed to intersect with each other, and the continuous wires 10 and 10 adjacent to each other are stacked together, the all 12 straight parts 14 are therefore disposed within a single plane extending in the Y directions.

Next, a method of forming the wave winding coil 1 from the group of continuous wires 100 including the six continuous wires 10 arranged in parallel to each other will be described. A specific configuration of a wave winding coil forming machine 200 used to form the wave winding coil 1 will first be described with reference to FIGS. 10 and 11.

The wave winding coil forming machine 200 includes a loading stand 201 to which the group of continuous wires 100 are to be loaded, a first clamp part 202, a second clamp part 203, and a third clamp part 204, which hold the group of continuous wires 100 to form inclined parts and to perform folding, and a holding mechanism 205 that holds and conveys the group of continuous wires 100.

On an upper surface 201a of the loading stand 201, the group of continuous wires 100 conveyed by a non-illustrated conveyor are placed flat with the U-shaped parts 12A (first ones of the turning parts 12) facing the first clamp part 202.

The first clamp part 202, the second clamp part 203, and the third clamp part 204 are disposed along a conveyance route for the group of continuous wires 100 that undergo forming. The first clamp part 202, the second clamp part 203, and the third clamp part 204 are provided to be movable upward and downward in upper and lower directions of the wave winding coil forming machine 200 (vertical directions with respect to the paper plane of the FIG. 10, and upper and lower directions in FIG. 11). The first clamp part 202, the second clamp part 203, and the third clamp part 204 are disposed below the upper surface 201a of the loading stand 201 to prevent, when the first clamp part 202, the second clamp part 203, and the third clamp part 204 are not clamping the group of continuous wires 100, the conveyance of the group of continuous wires 100 from being interrupted. The first clamp part 202, the second clamp part 203, and the third clamp part 204 are configured to move upward to hold the group of continuous wires 100, when the group of continuous wires 100 are conveyed to a position above the first clamp part 202, the second clamp part 203, and the third clamp part 204.

The first clamp part 202 is disposed most proximally to the loading stand 201. The first clamp part 202 includes a pair of clamping members 202A and 202B that collectively hold the straight parts 14 of the continuous wires 10 constituting the group of continuous wires 100. The clamping members 202A and 202B each have a width exceeding a width of the group of continuous wires 100 in the Y directions illustrated in FIG. 8. The clamping members 202A and 202B are disposed to face the conveyance route for the group of continuous wires 100 and arranged in parallel to each other at a constant interval in a D1 direction that is a conveying direction of the group of continuous wires 100. With the constant interval between the clamping members 202A and 202B, a space part 202C is formed to allow a holding member 205A or 205B of the holding mechanism 205, described later, to be accommodated.

The second clamp part 203 is disposed on a side distal from the loading stand 201, relative to the first clamp part 202. The second clamp part 203 includes, similar to the first clamp part 202, a pair of clamping members 203A and 203B that collectively hold the straight parts 14 of the continuous wires 10 constituting the group of continuous wires 100. The clamping members 203A and 203B also each have a width exceeding the width of the group of continuous wires 100. The clamping members 203A and 203B are disposed to face the conveyance route for the group of continuous wires 100 and arranged in parallel to each other at a constant interval in the D1 direction that is the conveying direction of the group of continuous wires 100. With the constant interval between the clamping members 203A and 203B, a space part 203C is formed to allow the holding member 205A or 205B of the holding mechanism 205, described later, to be accommodated.

The third clamp part 204 is disposed on a side further distal from the loading stand 201, relative to the second clamp part 203. The third clamp part 204 includes, similar to the first clamp part 202 and the second clamp part 203, a pair of clamping members 204A and 204B that collectively hold the straight parts 14 of the continuous wires 10 constituting the group of continuous wires 100. The clamping members 204A and 204B also each have a width exceeding the width of the group of continuous wires 100. The clamping members 204A and 204B are disposed to face the conveyance route for the group of continuous wires 100 and arranged in parallel to each other at a constant interval in the D1 direction that is the conveying direction of the group of continuous wires 100. With the constant interval between the clamping members 204A and 204B, a space part 204C is formed to allow the holding member 205A or 205B of the holding mechanism 205, described later, to be accommodated.

Figure 11:
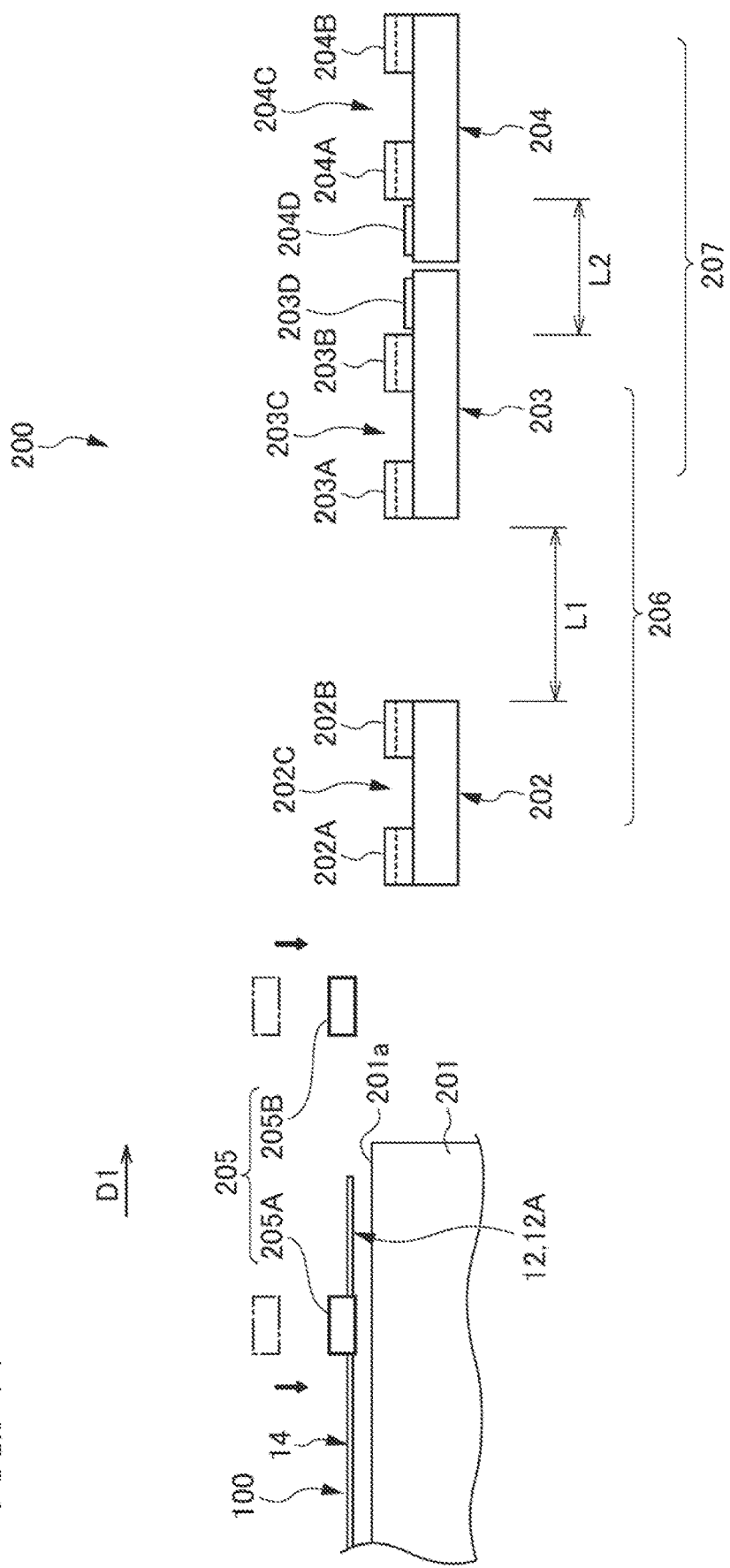
FIG. 11 is a side view schematically illustrating the outline of the wave winding coil forming machine.

The second clamp part 203 and the third clamp part 204 are respectively provided with pressing members 203D and 204D that are movable upward and downward in the upper and lower directions. The pressing member 203D of the second clamp part 203 is, on a side distal from the loading stand 201, disposed proximally to and arranged in parallel to the clamping member 203B. The pressing member 204D of the third clamp part 204 is, on the side proximal from the loading stand 201, disposed proximally to and arranged in parallel to the clamping member 204A. FIG. 11 illustrates positions of the pressing members 203D and 204D when the pressing members 203D and 204D are respectively moved downward. At this time, upper surfaces of the pressing members 203D and 204D are disposed below upper surfaces of the clamping members 203A, 203B, 204A, and 204B to prevent, from being interrupted, a conveyance operation for the group of continuous wires 100, and a holding operation and a conveyance operation for the group of continuous wires 100 by the clamping members 203A, 203B, 204A, and 204B.

Figure 10:
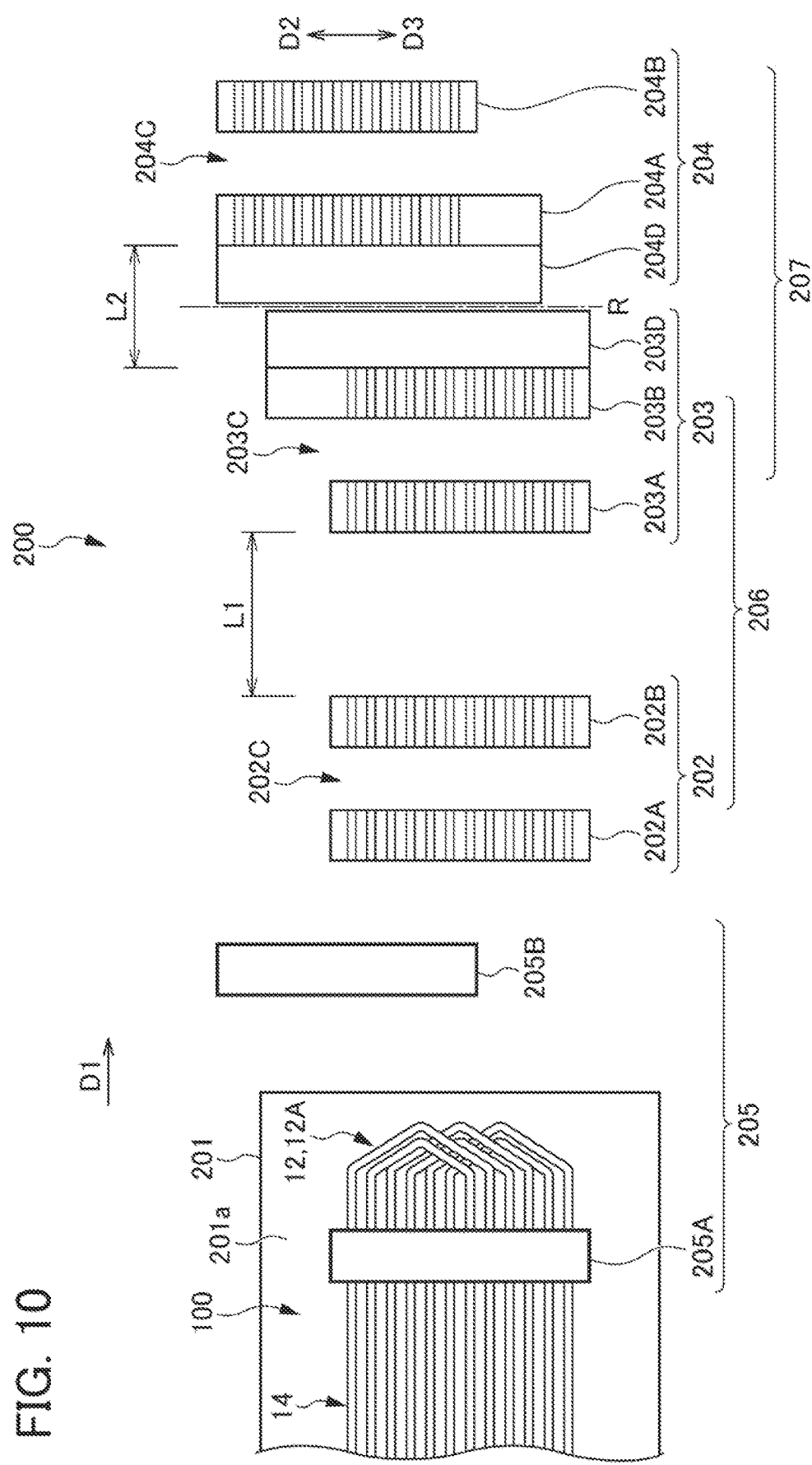
FIG. 10 is a plan view schematically illustrating an outline of a wave winding coil forming machine.

As illustrated in FIGS. 10 and 11, the clamping member 202B, which is disposed on the side distal from the loading stand 201, of the first clamp part 202 and the clamping member 203A, which is disposed on a side proximal to the loading stand 201, of the second clamp part 203 are separated from each other by a distance L1. The clamping member 203B, which is disposed on the side distal from the loading stand 201, of the second clamp part 203 and the clamping member 204A, which is disposed on the side proximal to the loading stand 201, of the third clamp part 204 are also separated from each other by a distance L2. The distance L2 is shorter than the distance L1.

The third clamp part 204 is disposed to be offset with respect to the first clamp part 202 and the second clamp part 203 in one direction (a D2 direction in FIG. 10) of width directions of the wave winding coil forming machine 200 (D2-D3 directions in FIG. 10). The D2-D3 directions are directions orthogonal to the D1 direction that is the conveying direction of the group of continuous wires 100. An amount of offset of the third clamp part 204 in the D2 direction with respect to the second clamp part 203 corresponds to one-half of the width of the group of continuous wires 100, i.e., a pitch between the six straight parts 14 of the continuous wires 10.

The second clamp part 203 and the third clamp part 204 are provided to be integrally movable with a non-illustrated movement mechanism in both the width directions of the wave winding coil forming machine 200. However, the first clamp part 202 is immovable. Therefore, in a state where at least the first clamp part 202 and the second clamp part 203 hold the group of continuous wires 100, and when the second clamp part 203 moves relative to the first clamp part 202 in one of the width directions of the wave winding coil forming machine 200, the straight parts 14 of the group of continuous wires 100 disposed between the first clamp part 202 and the second clamp part 203 are obliquely bent to form inclined parts 15 illustrated in FIG. 16. Therefore, the first clamp part 202 and at least the second clamp part 203 configure an inclined part forming mechanism 206 in the wave winding coil forming machine 200.

Figure 21:
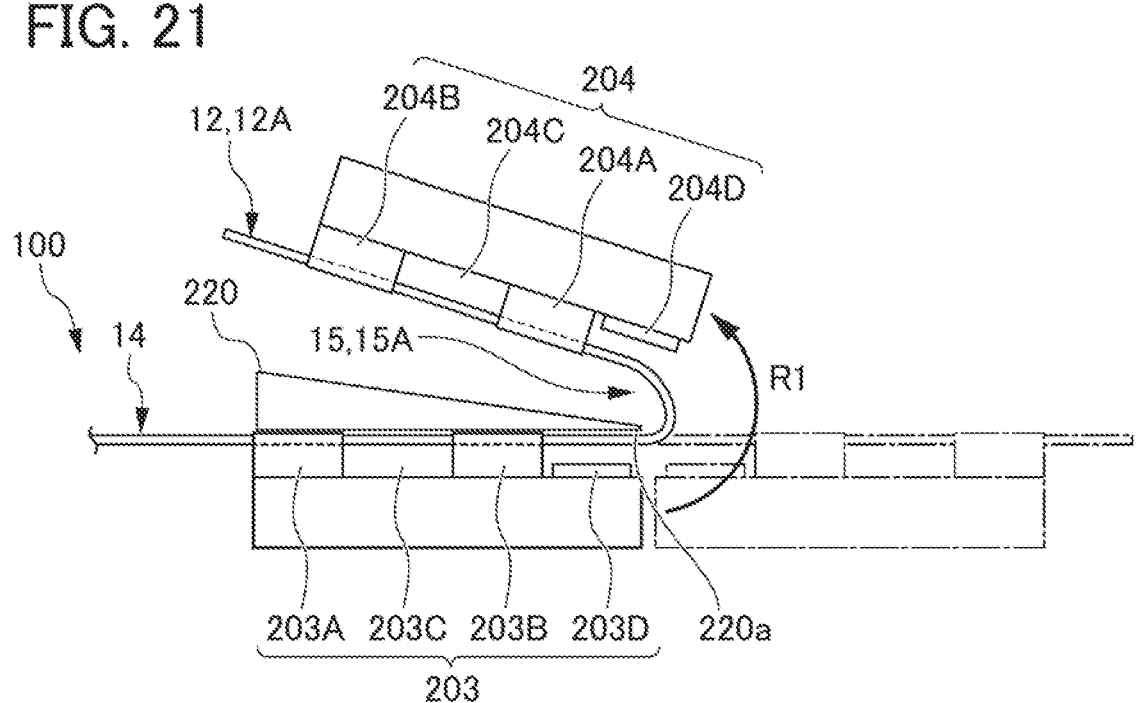
FIG. 21 is a side view illustrating an operation of the clamp parts when the inclined parts formed on the group of continuous wires undergo folding.

The third clamp part 204 is provided to be able to perform a rotation movement, with a non-illustrated rotation movement mechanism, to be folded along a folding line R (see FIG. 10) extending in the width directions between the second clamp part 203 and the third clamp part 204. The third clamp part 204 is thus placed over the second clamp part 203, as illustrated in FIG. 21. With the rotation movement of the third clamp part 204, the clamping member 203A and the clamping member 204B, the clamping member 203B and the clamping member 204A, the space parts 203C and 204C, and the pressing members 203D and 204D are respectively placed over each other. Therefore, the group of continuous wires 100 that the second clamp part 203 and the third clamp part 204 hold are folded along the folding line R in thickness directions (the X1-X2 directions in FIG. 9). Therefore, the second clamp part 203 and the third clamp part 204 configure a folding mechanism 207 in the wave winding coil forming machine 200.

As illustrated in FIG. 11, the holding mechanism 205 is disposed above the upper surface 201a of the loading stand 201. The holding mechanism 205 is provided to move, with a non-illustrated lifting mechanism, upward and downward with respect to the group of continuous wires 100 disposed below the holding mechanism 205. The holding mechanism 205 includes the pair of holding members 205A and 205B each having a width equal to or exceeding the width of the group of continuous wires 100. The holding members 205A and 205B respectively have structures identical to each other. The holding members 205A and 205B are disposed to be separated from each other by a certain distance in the D1 direction. The holding member 205B is disposed to be offset with respect to the holding member 205A in the D2 direction.

The holding mechanism 205 according to the embodiment is provided separately from the second clamp part 203 and the third clamp part 204 configuring the folding mechanism 207. Therefore, it is possible to always keep constant a folding position in the folding mechanism 207, appropriately keeping the accuracy of the folding position.

The holding mechanism 205, and the first clamp part 202, the second clamp part 203, and the third clamp part 204 are movable relative to each other in the D1 direction. In the embodiment, the holding mechanism 205 is provided to be movable in the D1 direction. Therefore, the holding mechanism 205 conveys the group of continuous wires 100 being held, along the conveyance route in the D1 direction. A position of the group of continuous wires 100 is thus changed relative to the first clamp part 202, the second clamp part 203, and the third clamp part 204.

An interval between the pair of holding members 205A and 205B in the D1 direction is slightly narrower than an interval, in an initial state illustrated in FIG. 10, between the space part 202C of the first clamp part 202 and the space part 203C of the second clamp part 203, and is equal to an interval between the space part 203C of the second clamp part 203 and the space part 204C of the third clamp part 204. An amount of offset of the holding member 205B with respect to the holding member 205A in the D2 direction is equal to the amount of offset of the third clamp part 204 with respect to the second clamp part 203 in the D2 direction.

Figure 12:
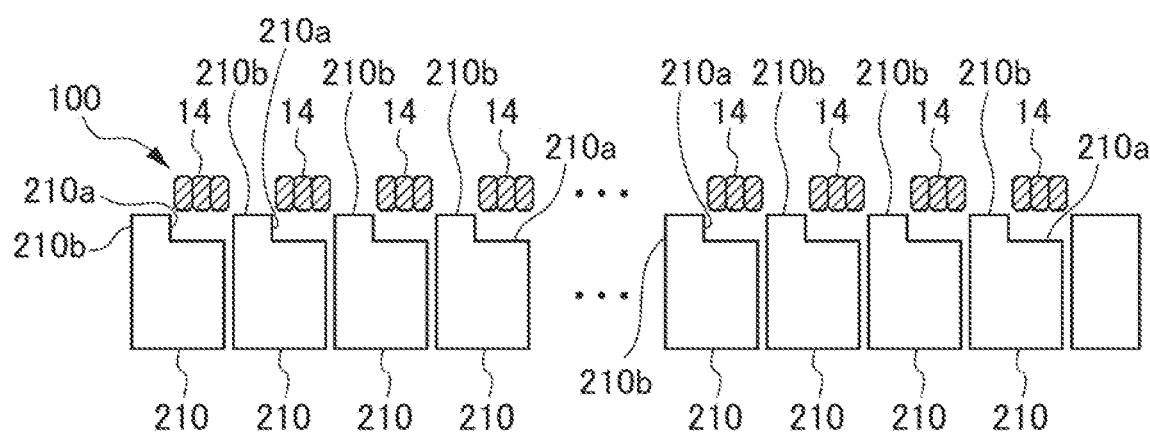
FIG. 12 is a view illustrating a state where clamp parts of the wave winding coil forming machine have unclamped the group of continuous wires.
Figure 13:
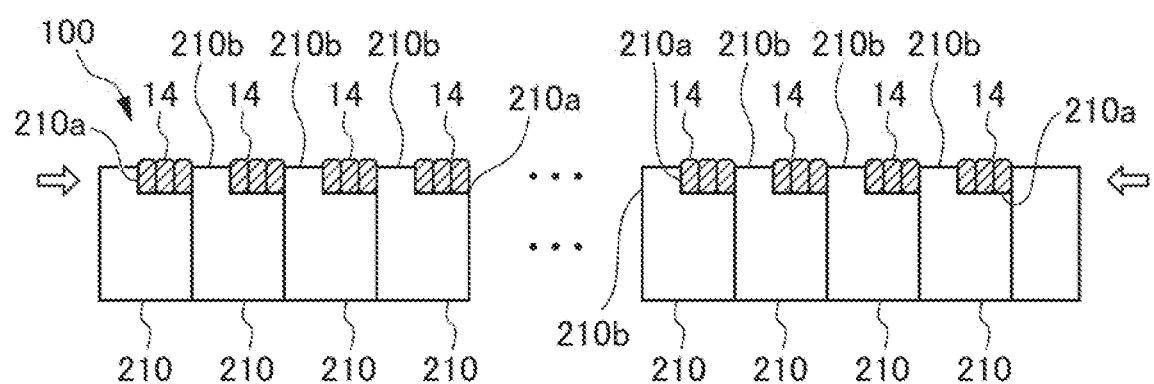
FIG. 13 is a view illustrating a state where the clamp parts of the wave winding coil forming machine have clamped the group of continuous wires.

Specific structures, for holding the group of continuous wires 100, of the clamping members 202A, 202B, 203A, 203B, 204A, and 204B and the holding members 205A and 205B may be identical to each other, among the clamping members 202A, 202B, 203A, 203B, 204A, and 204B and the holding members 205A and 205B. It is possible to configure a structure for holding the group of continuous wires 100 with, for example, as illustrated in FIGS. 12 and 13, a plurality of blocks 210 arranged in parallel to each other in an openable and closable manner in width directions of the group of continuous wires 100 (the Y directions in FIG. 8). The blocks 210 respectively have groove parts 210a each having a width slightly narrower than a width of each of the straight parts 14 of the continuous wires 10 constituting the group of continuous wires 100 (a width in the Y directions in FIG. 5). The groove parts 210a extend in the D1 direction that is one of the extending directions of the straight parts 14 of the group of continuous wires 100.

Each of the groove parts 210a is formed when an upper surface of each of the blocks 210 is substantially halved and one-half portion is cut out from a side surface in its width directions. Another one-half portion on the upper surface of each of the blocks 210 forms a pinching piece 210b that pinches each of the straight parts 14 of the continuous wires 10. The groove parts 210a and the pinching pieces 210b are respectively formed one by one on the blocks 210. The groove parts 210a and the pinching pieces 210b are greater in number than the straight parts 14 of the group of continuous wires 100. That is, in the embodiment, the clamping member 202A, 202B, 203A, 203B, 204A, or 204B or the holding member 205A or 205B has at least the 12 groove parts 210a and at least the 12 pinching pieces 210b.

As illustrated in FIG. 12, when the blocks 210 move away from each other, each of the clamping members 202A, 202B, 203A, 203B, 204A, and 204B and the holding members 205A and 205B comes to be in an open state. At this time, the width of each of the groove parts 210a each disposed between the pinching pieces 210b and 210b adjacent to each other becomes wider than the width of each of the straight parts 14 of the continuous wires 10. Therefore, it is possible to accommodate in or to remove from the groove parts 210a the straight parts 14 of the continuous wires 10.

On the other hand, as illustrated in FIG. 13, when the blocks 210 move closer to each other, each of the clamping members 202A, 202B, 203A, 203B, 204A, and 204B and the holding members 205A and 205B comes to be in a closed state. At this time, the width of each of the groove parts 210a each disposed between the pinching pieces 210b and 210b adjacent to each other becomes slightly narrower than the width of each of the straight parts 14 of the continuous wires 10. Therefore, the straight parts 14 of the continuous wires 10, which are accommodated in the groove parts 210a, are each individually pinched between the pinching pieces 210b and 210b adjacent to each other. Therefore, the group of continuous wires 100 are held.

As described above, each of the clamping members 202A, 202B, 203A, 203B, 204A, and 204B and the holding members 205A and 205B for holding the group of continuous wires 100 hold the straight parts 14 of the continuous wires 10 in the width directions. Width directions of the straight parts 14 (the Y directions illustrated in FIGS. 5 and 8) correspond to stacking directions of the plurality of unit wire materials 10a constituting each of the continuous wires 10. Therefore, even when the plurality of unit wire materials 10a are loose in thickness directions (the X directions illustrated in FIG. 4), it is possible to integrally pinch and hold the plurality of unit wire materials 10a constituting each of the continuous wires 10. In addition, no separate pressing member is required for pressing the continuous wires 10 to prevent the unit wire materials 10a from becoming loose, making it possible to achieve a small sized machine.

Note that, FIGS. 12 and 13 illustrate a case where the straight parts 14 of the group of continuous wires 100 are held from below. The case corresponds to a case where the clamping members 202A, 202B, 203A, 203B, 204A, and 204B hold the straight parts 14 of the group of continuous wires 100 from below. To cause the holding members 205A and 205B to hold the straight parts 14 of the group of continuous wires 100, a configuration vertically reversed from the configuration illustrated in FIGS. 12 and 13 is applied.

Next, a specific forming operation when the wave winding coil forming machine 200 performs forming on the group of continuous wires 100 will be described. As illustrated in FIGS. 10 and 11, the group of continuous wires 100 formed from the six continuous wires 10 (the continuous wires 10U1, 10U2, 10V1, 10V2, 10W1, and 10W2) are first loaded onto the upper surface 201a of the loading stand 201 with the U-shaped parts 12A (the first ones of the turning parts 12) facing toward the first clamp part 202.

When the holding mechanism 205 moves toward the group of continuous wires 100 on the loading stand 201, and the holding member 205A disposed on the side proximal to the loading stand 201 stays above the group of continuous wires 100, the holding mechanism 205 moves downward and the holding member 205A holds the straight parts 14, which lie adjacent to the U-shaped parts 12A, of the group of continuous wires 100, respectively. A. this time, the other holding member, i.e., the holding member 205B, does not hold the group of continuous wires 100, but stays between the loading stand 201 and the first clamp part 202. The holding mechanism 205 holding the group of continuous wires 100 linearly moves in the D1 direction along the extending directions of the straight parts 14 to convey, as illustrated in FIG. 14, the group of continuous wires 100 to a position above the first clamp part 202 and the second clamp part 203 constituting the inclined part forming mechanism 206.

Figure 14:
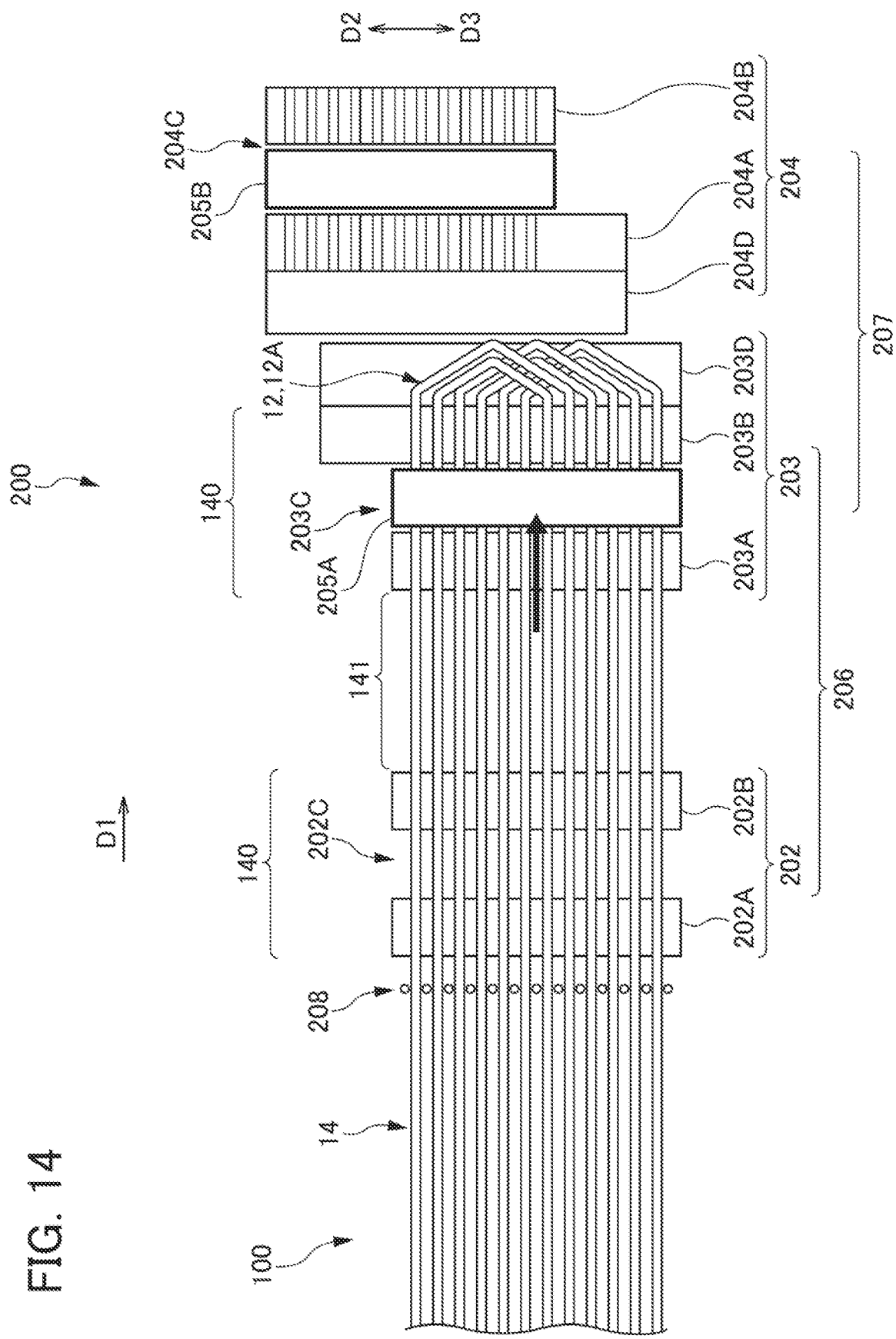
FIG. 14 is a plan view of the wave winding coil forming machine, illustrating a situation where the group of continuous wires are conveyed to a position at where inclined parts are to be formed.

The reference number 208 in FIG. 14 indicates guide members that are a plurality of pins disposed between the loading stand 201 and the first clamp part 202. After the U-shaped parts 12A of the group of continuous wires 100 have passed above the first clamp part 202, the guide members 208 move upward from below the group of continuous wires 100, and each enter a space between the straight parts 14 and 14 adjacent to each other. Therefore, the straight parts 14 of the group of continuous wires 100 being conveyed are prevented from coming into contact with each other. The group of continuous wires 100 being conveyed are thus smoothly guided.

Figure 15:
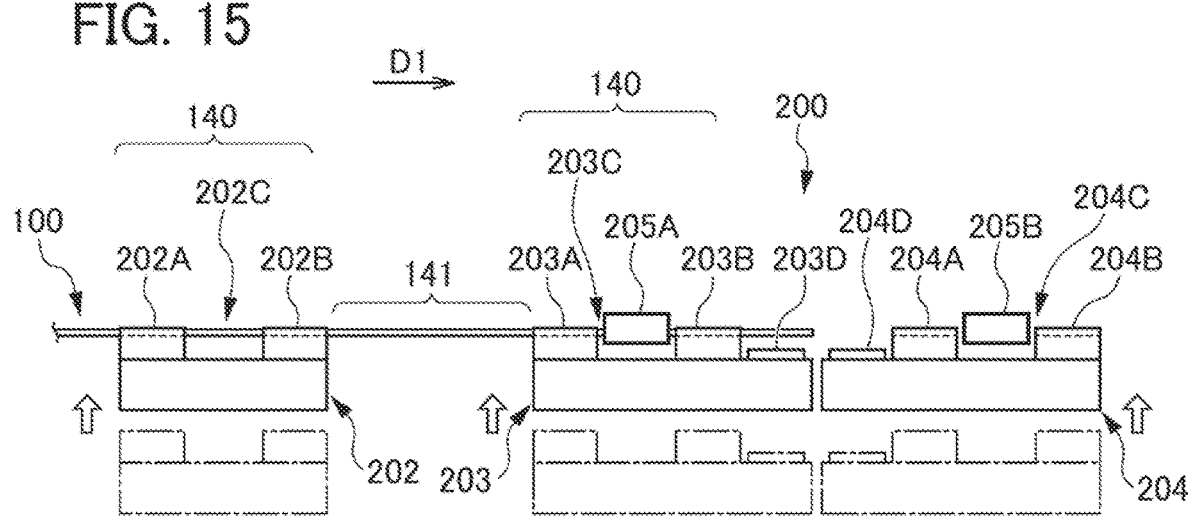
FIG. 15 is a side view of the wave winding coil forming machine, illustrating the situation where the group of continuous wires are conveyed to the position at where inclined parts are to be formed.

After the holding member 205A holding the group of continuous wires 100 moves to a position above the space part 203C of the second clamp part 203, as illustrated in FIGS. 14 and 15, and then, as the first clamp part 202, the second clamp part 203, and the third clamp part 204 integrally move upward, the holding member 205A is accommodated in the space part 203C. When the first clamp part 202 and the second clamp part 203 move upward, the clamping members 202A, 202B, 203A, and 203B come to be in the open state, as illustrated in FIG. 12. Therefore, as the first clamp part 202 and the second clamp part 203 move upward, the straight parts 14 of the group of continuous wires 100 are respectively accommodated in the groove parts 210a, each between the pinching pieces 210b and 210b adjacent to each other. After the straight parts 14 are accommodated in the groove parts 210a, the clamping members 202A, 202B, 203A, and 203B come to be in the closed state, holding the group of continuous wires 100.

As illustrated in FIGS. 14 and 15, holding target parts 140 and 140 of the straight parts 14 that the first clamp part 202 and the second clamp part 203 hold are portions corresponding to the slot disposition parts 11 of the wave winding coil 1. Therefore, the interval between the pair of clamping members 202A and 202B in the extending directions of the straight parts 14 (a length, in the D1 direction, of the first clamp part 202 including the space part 202C) and the interval between the pair of clamping members 203A and 203B (a length, in the D1 direction, of the second clamp part 203 including the space part 203C) are each substantially identical to a length of each of the slot disposition parts 11 of the wave winding coil 1.

As illustrated in FIGS. 14 and 15, on the straight parts 14 of the group of continuous wires 100, portions 141 disposed between the first clamp part 202 and the second clamp part 203 are portions of the group of continuous wires 100, where the inclined parts 15 are to be formed. The portions 141 are also portions corresponding to the turning parts 12 of the wave winding coil 1. A length of each of the portions 141, i.e., the distance L1 between the first clamp part 202 and the second clamp part 203 illustrated in FIGS. 10 and 11, is substantially identical to a length of each of the turning parts 12 of the wave winding coil 1 when the turning part 12 is stretched straightfowardly.

After the first clamp part 202 and the second clamp part 203 hold the group of continuous wires 100, the holding mechanism 205 releases the group of continuous wires 100 and moves back upwardly to a position above the group of continuous wires 100. After that, for the preparation of a next holding operation, as illustrated in FIG. 16, the holding member 205A moves to a position above the space part 202C of the first clamp part 202.

Figure 16:
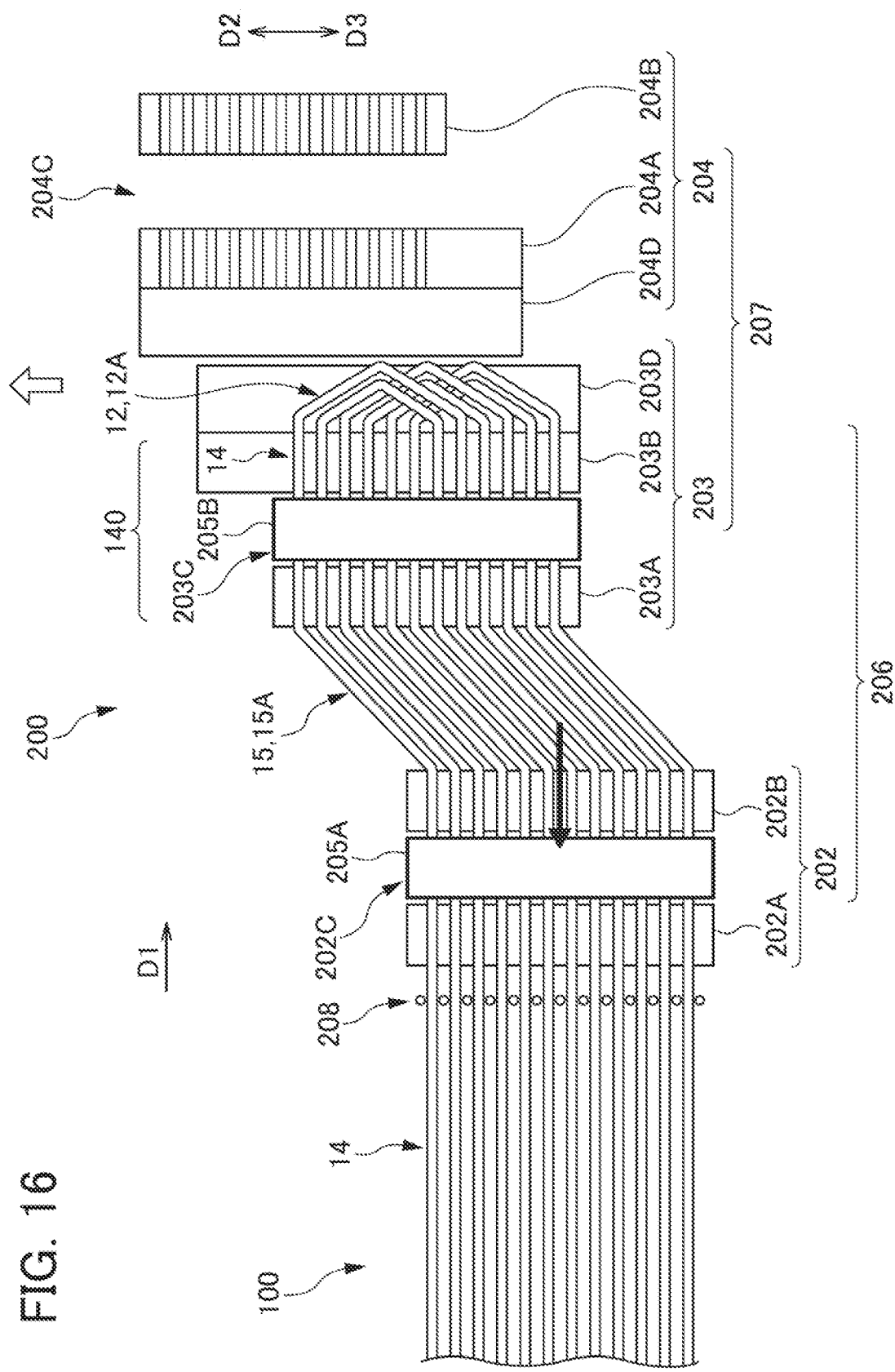
FIG. 16 is a plan view of the wave winding coil forming machine, illustrating a situation where inclined parts are being formed on the group of continuous wires.

Next, the wave winding coil forming machine 200 causes, from a state where the first clamp part 202 and the second clamp part 203 are holding the group of continuous wires 100, the second clamp part 203 and the third clamp part 204 to move relative to the first clamp part 202 in the D2 direction, as illustrated in FIG. 16. That is, the U-shaped parts 12A of the continuous wires 10 constituting the group of continuous wires 100 and the holding target parts 140 that the second clamp part 203 holds are caused, within a plane on which the continuous wires 10 constituting the group of continuous wires 100 extend (within a paper plane in FIG. 16), to be offset in the direction (the D2 direction) intersecting the extending directions of the straight parts 14. Therefore, the portions 141 including the 12 straight parts 14 disposed between the first clamp part 202 and the second clamp part 203 are inclined in the offset direction (the D2 direction), forming respective first ones of the inclined parts 15 (inclined parts 15A) on the continuous wires 10 constituting the group of continuous wires 100.

An inclination angle of each of the inclined parts 15 relative to the straight parts 14 is, as illustrated in FIG. 5, substantially equal to the inclination angle of each of the first inclined parts 12a or the second inclined parts 12b of the turning parts 12 formed on the continuous wires 10. Forming the inclined parts 15 on the group of continuous wires 100 causes a side, which is adjacent to the U-shaped parts 12A, of the group of continuous wires 100 that the second clamp part 203 holds to be disposed and offset, with respect to the straight parts 14 that the first clamp part 202 holds, in the D2 direction by an amount of offset, which corresponds to one-hair of the width of the group of continuous wires 100, i.e., a pitch between the six straight parts 14 of the continuous wires 10.

Figure 17:
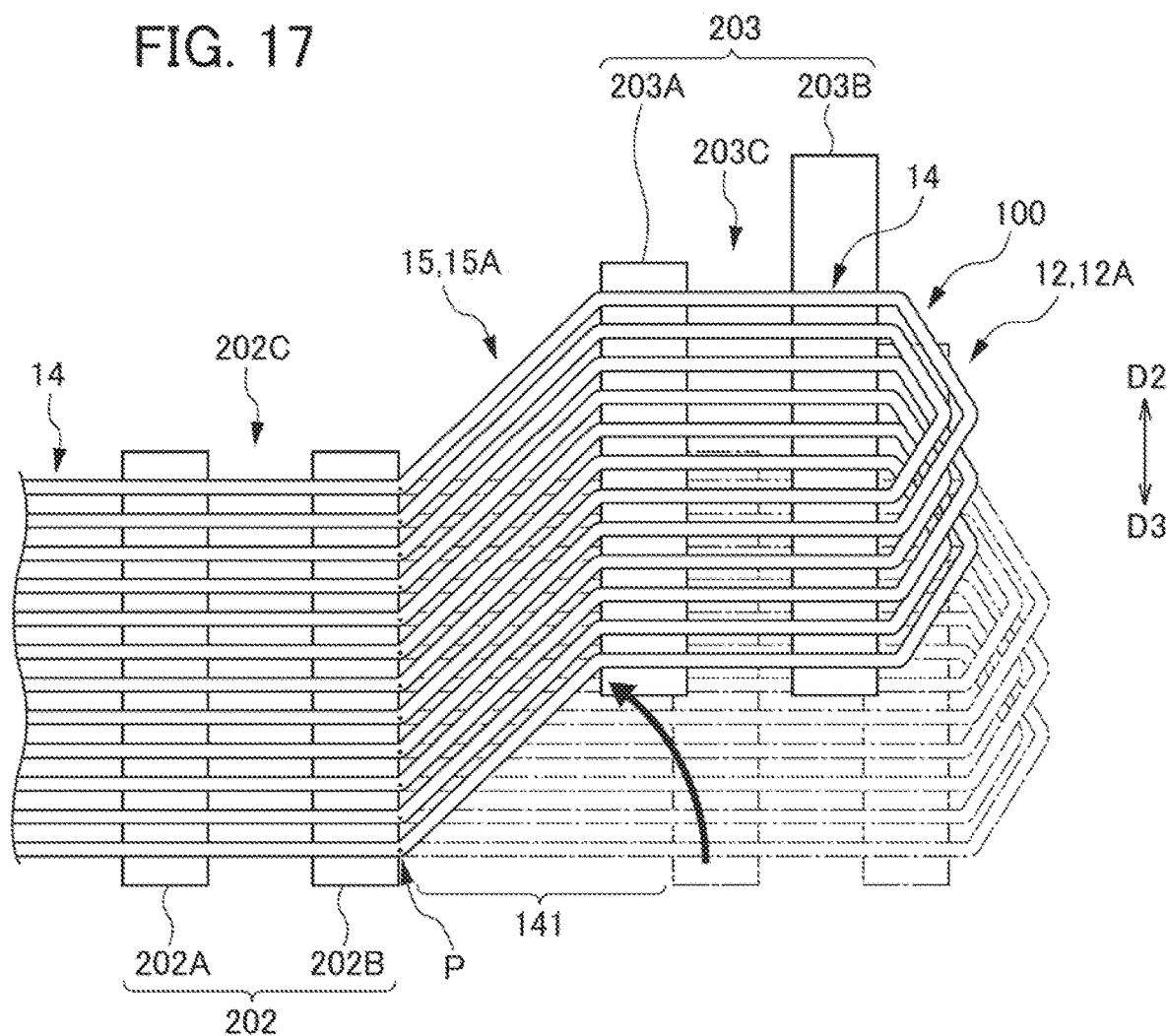
FIG. 17 is a plan view illustrating an operation of the clamp parts when the inclined parts are being formed on the group of FIG. 18 is a plan view illustrating the inclined parts of the continuous wires after the inclined parts are formed.
Figure 18:
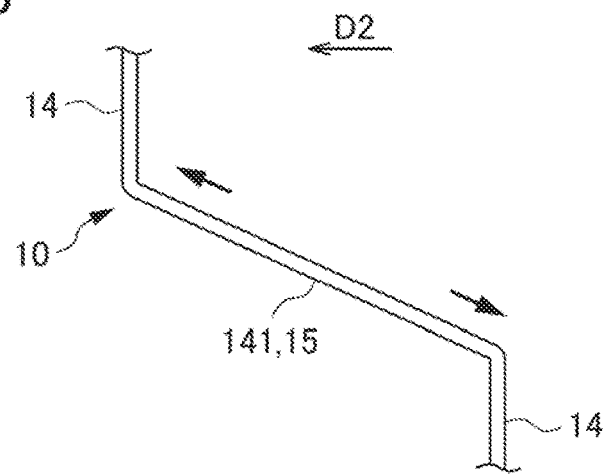

The wave winding coil forming machine 200 according to the embodiment is configured to not cause, when the inclined parts 15 are to be formed, the side adjacent to the second clamp part 203 to move straightforwardly in the D2 direction, but, as illustrated in FIG. 17, to cause the side adjacent to the second clamp part 203 to move in an arc shape around bending points P serving as boundary points between the inclined parts 15 and the straight parts 14 that are continued from the inclined parts 15 and that the first clamp part 202 holds, at a radius corresponding to a length of each of the inclined parts 15. At this time, the side adjacent to the second clamp part 203 keeps the parallelism to the first clamp part 202, and moves in the arc shape. Therefore, as illustrated with arrows in FIG. 18, the inclined parts 15 (the portions 141) are pulled and formed in opposite directions. The straightness of the inclined parts 15 after formed thus becomes satisfactory, improving the forming accuracy for the inclined parts 15.

When the second clamp part 203 is offset in the D2 direction to form the inclined parts 15, as illustrated in FIG. 16, the interval between the space part 202C of the first clamp part 202 and the space part 203C of the second clamp part 203 becomes slightly smaller, and becomes coincident with the interval between the pair of holding members 205A and 205B. Therefore, after the group of continuous wires 100 are formed with the first ones of the inclined parts 15 (the inclined parts 15A), when the holding mechanism 205 lying at the position illustrated in FIG. 16 moves downward toward the group of continuous wires 100, the holding members 205A and 205B are respectively accommodated in the space parts 202C and 203C, making it possible to hold the group of continuous wires 100.

At this time, since the pair of holding members 205A and 205B hold the group of continuous wires 100 at two points on the straight parts 14 and 14 respectively disposed on both sides with respect to the inclined parts 15, the group of continuous wires 100 are less likely to become loose. After that, as the holding mechanism 205 holds the group of continuous wires 100, the first clamp part 202 and the second clamp part 203 release the group of continuous wires 100, move downward and also move in the D3 direction, and return to the position when the first clamp part 202 and the second clamp part 203 are in the initial state.

Figure 19:
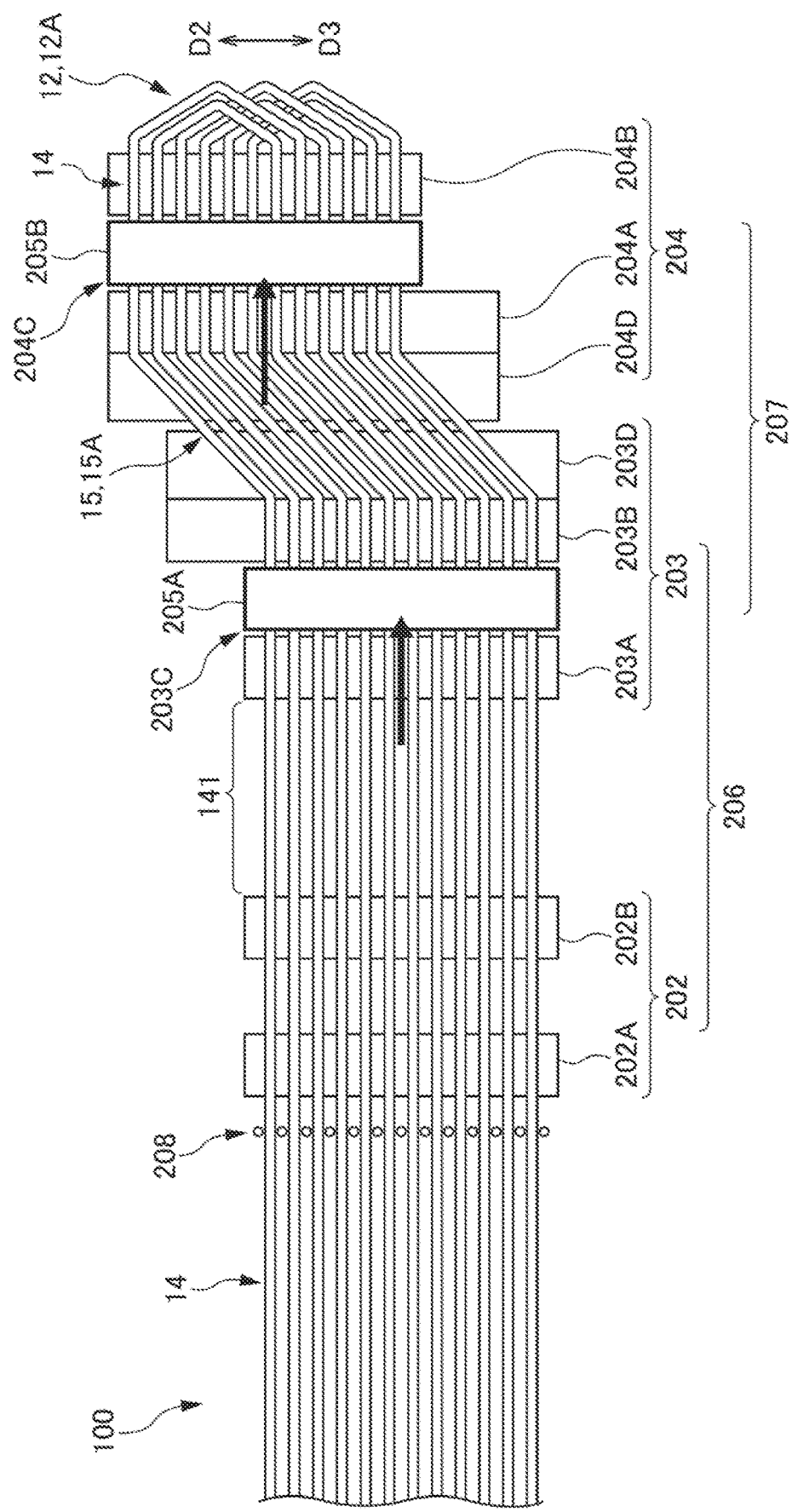
FIG. 19 is a plan view of the wave winding coil forming machine, illustrating a situation where the group of continuous wires formed with the inclined parts are conveyed to a folding position.

After that, the holding mechanism 205 holding the group of continuous wires 100 moves in the D1 direction to convey the group of continuous wires 100, as illustrated in FIG. 19, until the holding member 205A moves to a position above the space part 203C of the second clamp part 203, and the holding member 205B moves to a position above the space part 204C of the third clamp part 204. The third clamp part 204 is offset beforehand in the D2 direction with respect to the first clamp part 202 and the second clamp part 203 by one-half of the width of the group of continuous wires 100. The holding member 205B of the holding mechanism 205 is similarly offset with respect to the holding member 205A. Therefore, as the first clamp part 202, the second clamp part 203, and the third clamp part 204 move upward, the holding members 205A and 205B holding the group of continuous wires 100 after the first ones of the inclined parts 15 (the inclined parts 15A) are formed are respectively accommodated in the space part 203C of the second clamp part 203 and the space part 204C of the third clamp part 204.

After the first clamp part 202, the second clamp part 203, and the third clamp part 204 move upward, the first clamp part 202, the second clamp part 203, and the third clamp part 204 respectively hold the straight parts 14 of the group of continuous wires 100. The holding mechanism 205 then releases the group of continuous wires 100. At this time, the inclined parts 15 formed on the group of continuous wires 100 are disposed between the clamping member 203B of the second clamp part 203 and the clamping member 204A of the third clamp part 204. That is, the distance L2 between the clamping member 203B and the clamping member 204A is substantially equal to a distance between the straight parts 14 and 14 that are adjacent to each other with respect to the inclined parts 15. The portions 141 to be then newly formed as the inclined parts 15 are also disposed between the first clamp part 202 and the second clamp part 203. After the holding mechanism 205 moves back upwardly to a position above the group of continuous wires 100, the holding mechanism 205 moves, for the preparation of next holding, as illustrated in FIG. 20, to the position above the space part 202C of the first clamp part 202 and the space part 203C of the second clamp part 203.

Figure 20:
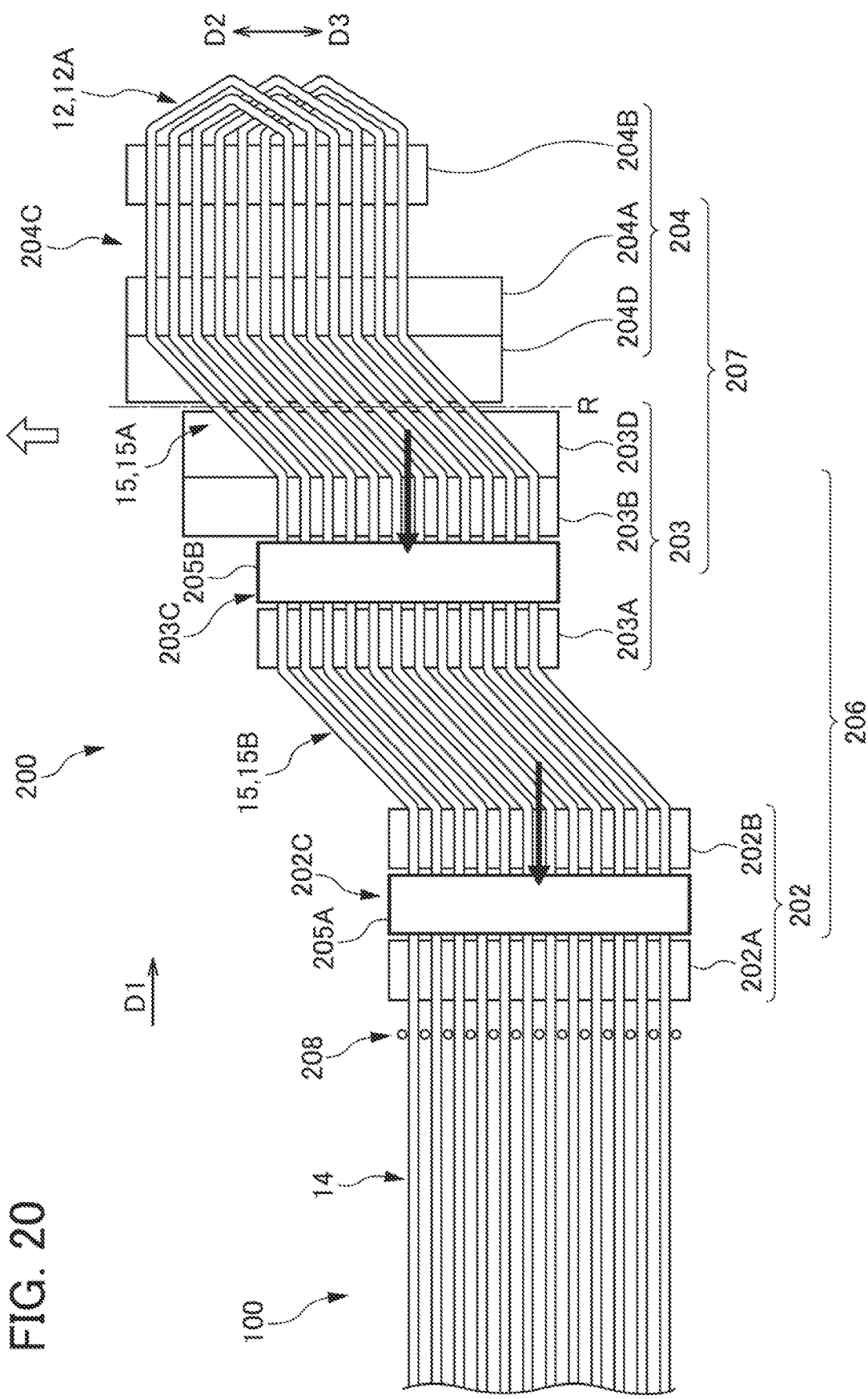
FIG. 20 is a plan view of the wave winding coil forming machine, illustrating a situation where next inclined parts are being formed on the group of continuous wires after the inclined parts are formed.

After that, similar to the case illustrated in FIG. 16, the second clamp part 203 and the third clamp part 204 are caused to move in the D2 direction to form, as illustrated in FIG. 20, between the first clamp part 202 and the second clamp part 203, respective second ones of the inclined parts 15 (inclined parts 15B) (inclined part forming step).

Next, at the center part of each of the first ones of the inclined parts 15A, which are disposed between the second clamp part 203 and the third clamp part 204, i.e., at points along the folding line R disposed between the second clamp part 203 and the third clamp part 204 (see FIGS. 10 and 20), the third clamp part 204 performs a rotation movement to overlap with the second clamp part 203, as illustrated in FIG. 21, to fold the first ones of the inclined parts, i.e., the inclined parts 15A (folding step).

With the rotation movement of the third clamp part 204, the first ones of the inclined parts, i.e., the inclined parts 15A, of the group of continuous wires 100 are folded in one of the thickness directions of the group of continuous wires 100. The folding line R is disposed to extend in the D2-D3 directions along the width directions of the group of continuous wires 100. The folding line R further intersects the inclined parts 15A. Therefore, as the inclined parts 15A are folded, the folded parts newly serve as the 12 turning parts 12 (second turning parts 12B) each having a projected shape (a triangular shape) having the apex part (the apex parts 12c) at the folding line R. In the embodiment, the rotation movement of the third clamp part 204 causes the inclined parts 15A to be folded forward along the folding line R in a direction toward the near side on the paper plane in FIG. 20 (an R1 direction).

Figure 23:
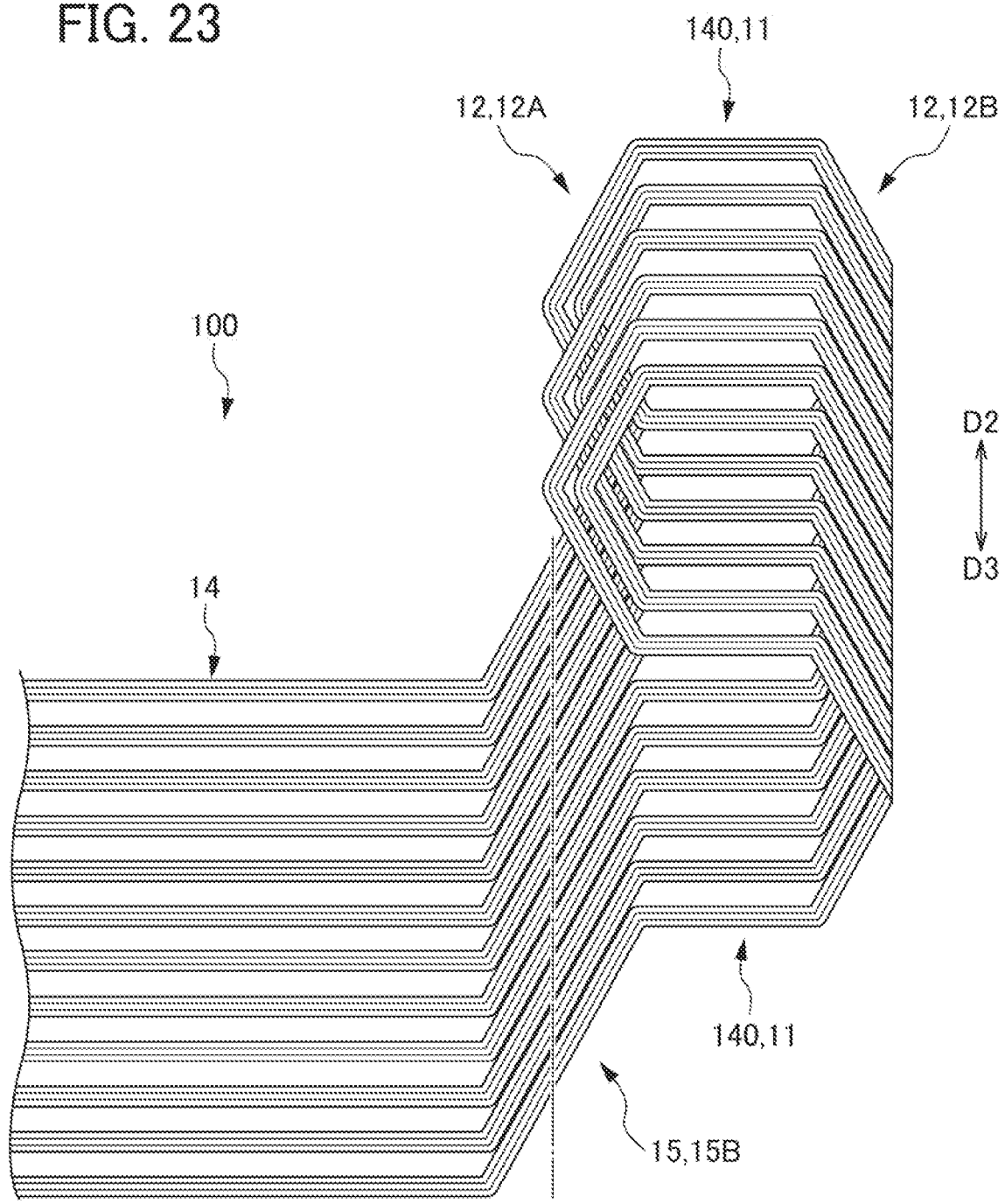
FIG. 23 is a plan view illustrating the group of continuous wires after the inclined parts are folded.

FIG. 23 illustrates only the group of continuous wires 100 after the first ones of the inclined parts, i.e., the inclined parts 15A, are folded. As illustrated in FIG. 23, after the first ones of the inclined parts, i.e., the inclined parts 15A, are folded, the holding target parts 140 and 140 of the straight parts 14 that the second clamp part 203 and the third clamp part 204 hold partially overlap with each other to become parallel to each other. Specifically, six out of the 12 holding target parts 140 that the second clamp part 203 holds and six out of the 12 holding target parts 140 that the third clamp part 204 holds overlap with each other. Therefore, the slot disposition parts 11, a total width of which corresponds to a total width of the 18 straight parts 14, is formed. The straight parts 14 and 14 folded to overlap with each other are the straight parts 14 and 14 of the continuous wires 10 belonging to one identical phase among the three phases of U, V and W. The straight parts 14 and 14 belonging to the one identical phase, which overlap with each other, are accommodated in a single one of the slots 23, when the wave winding coil 1 is attached to the stator core 20.

Figure 22:
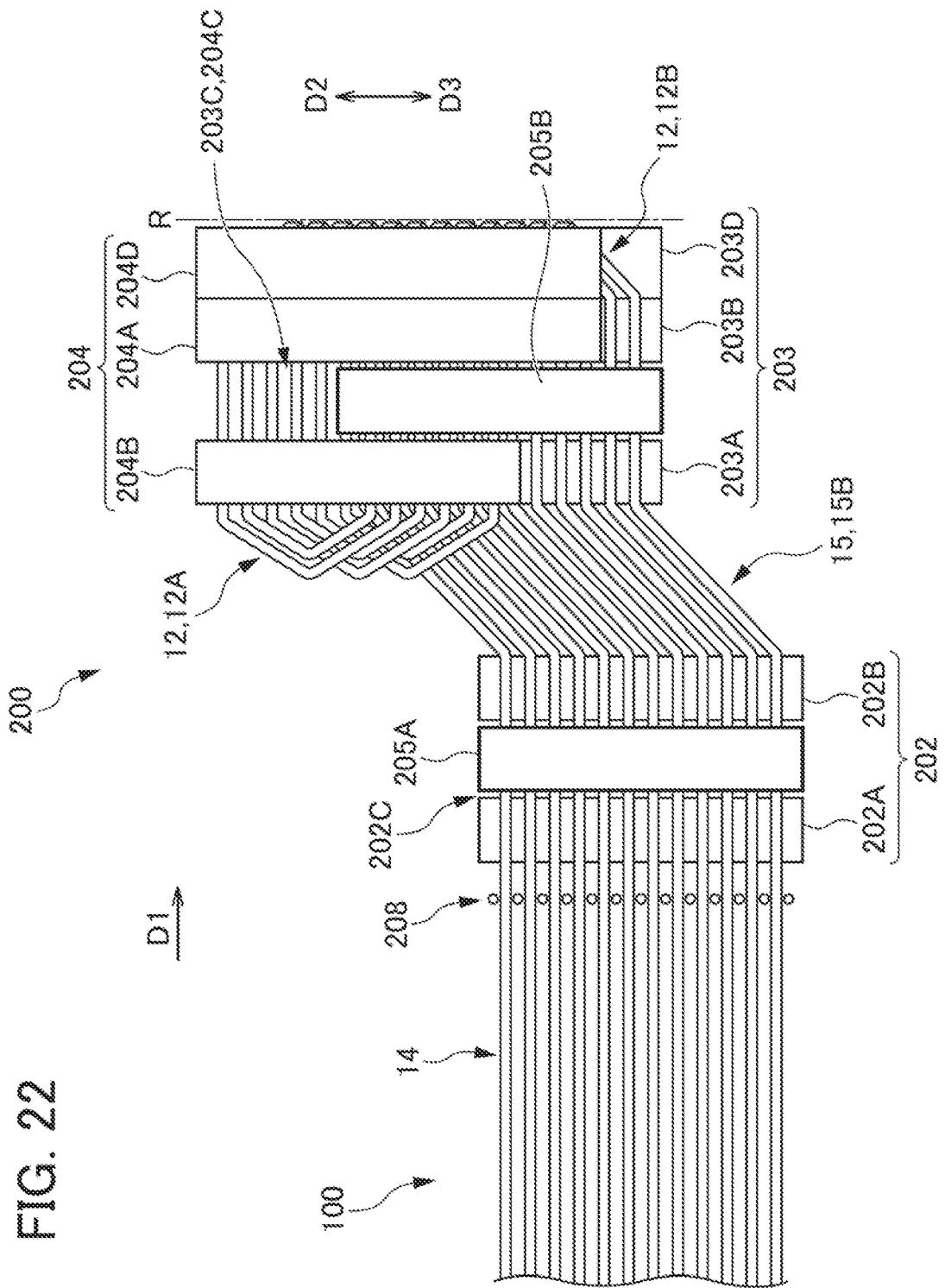
FIG. 22 is a plan view of the wave winding coil forming machine, illustrating a situation where the inclined parts formed on the group of continuous wires are folded.

Note that, in the embodiment, before the folding step is performed for the first time on the group of continuous wires 100, the two inclined parts 15 (the inclined parts 15A and 15B) are formed on each of the group of continuous wires 100. Therefore, as illustrated in FIG. 22, the U-shaped parts 12A of the group of continuous wires 100 after folding are disposed to overlap with the secondly formed ones of the inclined parts 15 (the inclined parts 15B). Therefore, the turning parts 12 after folding do not come into contact with the straight parts 14 of the group of continuous wires 100.

When the inclined parts 15 are to be folded, as illustrated in FIG. 22, a folding jig 220 may be inserted between the second clamp part 203 and the third clamp part 204. The folding jig 220 is formed into a triangular shape in cross section. A peripheral part 220a having an acute apex is inserted along the folding line R on the inclined parts 15. Therefore, it is possible to allow the third clamp part 204 to accurately fold the inclined parts 15 along the folding line R. Before the folding operation is completed, the folding jig 220 is removed from between the second clamp part 203 and the third clamp part 204.

Figure 24:
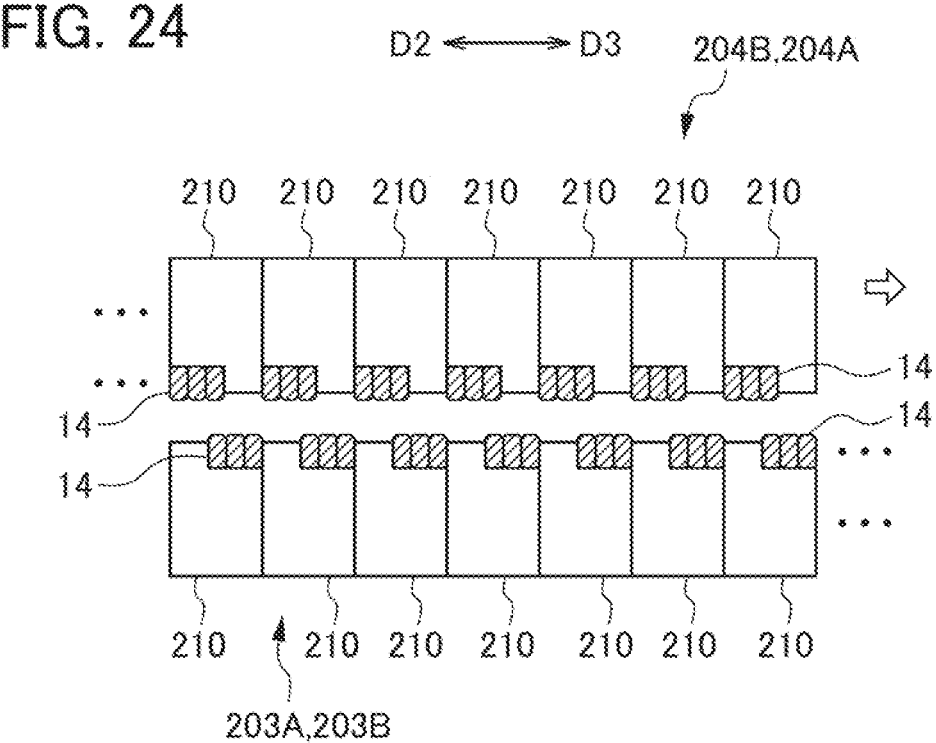
FIG. 24 is a view illustrating an operation of the clamp parts after the inclined parts are folded.

After the inclined parts 15 are fully folded, the third clamp part 204 may also be caused to slightly move, in a state where the group of continuous wires 100 are held, as illustrated with a white hollow arrow in FIG. 24, relative to the second clamp part 203 in arrangement directions of the straight parts 14 and in width directions of the folded parts (the D2-D3 directions). Therefore, it is possible to suppress, from occurring, spring-back where the turning parts 12 after the inclined parts 15 are folded open and returning to the original shape. It is also possible to adjust a pitch between two adjacent ones of the six straight parts 14 being folded.

Figure 25:
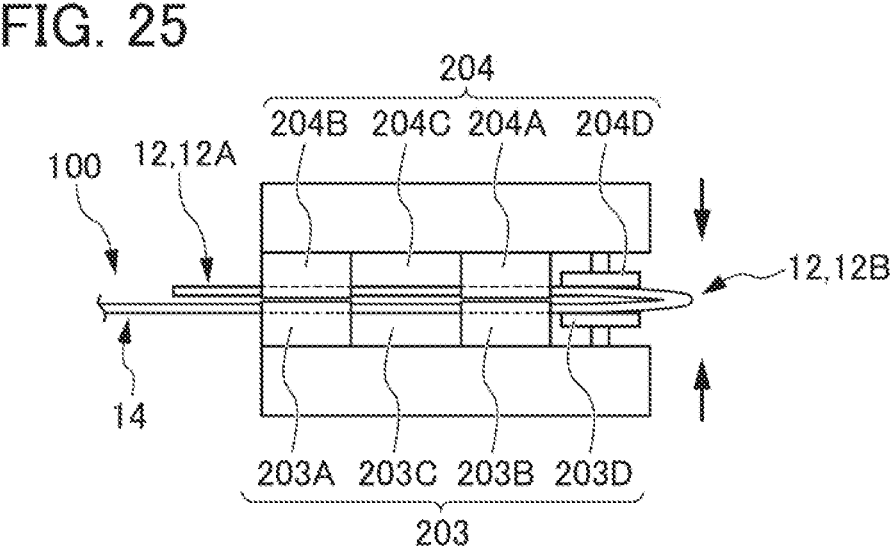
FIG. 25 is a side view illustrating an operation of pressing the folded part with pressing members after the inclined parts are folded.
Figure 26:
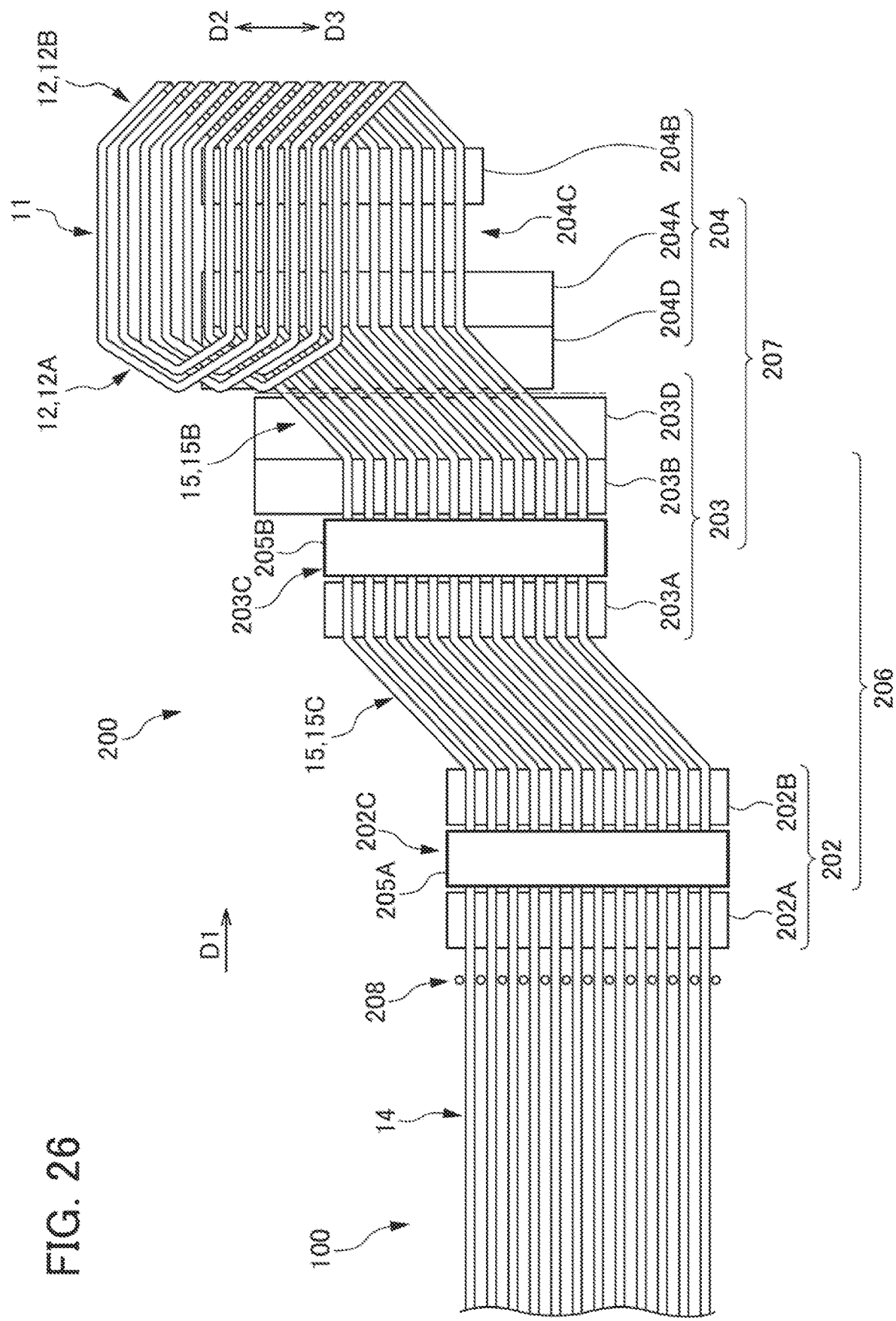
FIG. 26 is a plan view of the wave winding coil forming machine, illustrating a situation where next inclined parts are being formed on the group of continuous wires after folding.

In the folding step, after the inclined parts 15 are folded, and in a state where the second clamp part 203 and the third clamp part 204 overlap with each other, as illustrated in FIG. 25, the pressing member 203D of the second clamp part 203 moves upward relative to the second clamp part 203. The pressing member 204D of the third clamp part 204 also moves downward relative to the third clamp part 204. The turning parts 12 that are the folded parts of the group of continuous wires 100 are thus pinched between the pressing members 203D and 204D and pressed in the thickness directions. Therefore, it is possible to suppress the turning parts 12 from expanding in the thickness directions due to spring-back, further improving the forming accuracy for the turning parts 12. It is also possible to immediately press the turning parts 12 that the second clamp part 203 and the third clamp part 204 have formed, simplifying the machine and the process steps, without the necessity of providing a separate station for pressing.

After the second turning parts 12B are formed, the holding mechanism 205 further conveys the group of continuous wires 100 in the D1 direction to dispose the secondly formed inclined parts, i.e., the inclined parts 15B, between the second clamp part 203 and the third clamp part 204. After that, similar to the case illustrated in FIG. 20, third ones of the inclined parts 15 (inclined parts 15C) are formed on the straight parts 14 disposed between the first clamp part 202 and the second clamp part 203.

After that, until the wave winding coil 1 formed from the group of continuous wires 100 has a predetermined length corresponding to the four circumferential lengths of the stator core 20, similarly as described above, the folding step for the second ones of the inclined parts, i.e., the inclined parts 15B, the inclined part forming step for forming the fourth ones of the inclined parts, the folding step for the third ones of the inclined parts, i.e., the inclined parts 15C, and subsequent necessary steps, are alternately and repeatedly executed. Therefore, the wave winding coil 1 having a sheet shape corresponding to eight layers (eight turns) of 1T to 8T, where the slot disposition parts 11 that are offset by an amount corresponding to a total width of six wires overlap with each other to form two layers, is formed.

In the wave winding coil 1 formed as described above, in a state where the transposition shapes of the U-shaped parts 12A of the continuous wires 10 (the continuous wires 10U1, 10U2, 10V1, 10V2, 10W1, and 10W2) are maintained, the inclined parts are formed through the inclined part forming step, and the turning parts are formed through the folding step. Therefore, with the method of manufacturing the wave winding coil 1, according to the embodiment, only by disposing, inside and outside each other, the U-shaped parts 12A and 12A of the two continuous wires 10 and 10 belonging to one phase, as illustrated in FIG. 7, by stacking the six continuous wires 10 respectively belonging to all the phases to stack together, as illustrated in FIGS. 8 and 9, described above, and then by alternately executing the inclined part forming step and the folding step, it is possible to simply and easily form the transposed, wave winding coil 1 from the continuous wires 10, without the necessity of changing a folding method.

Figure 27:
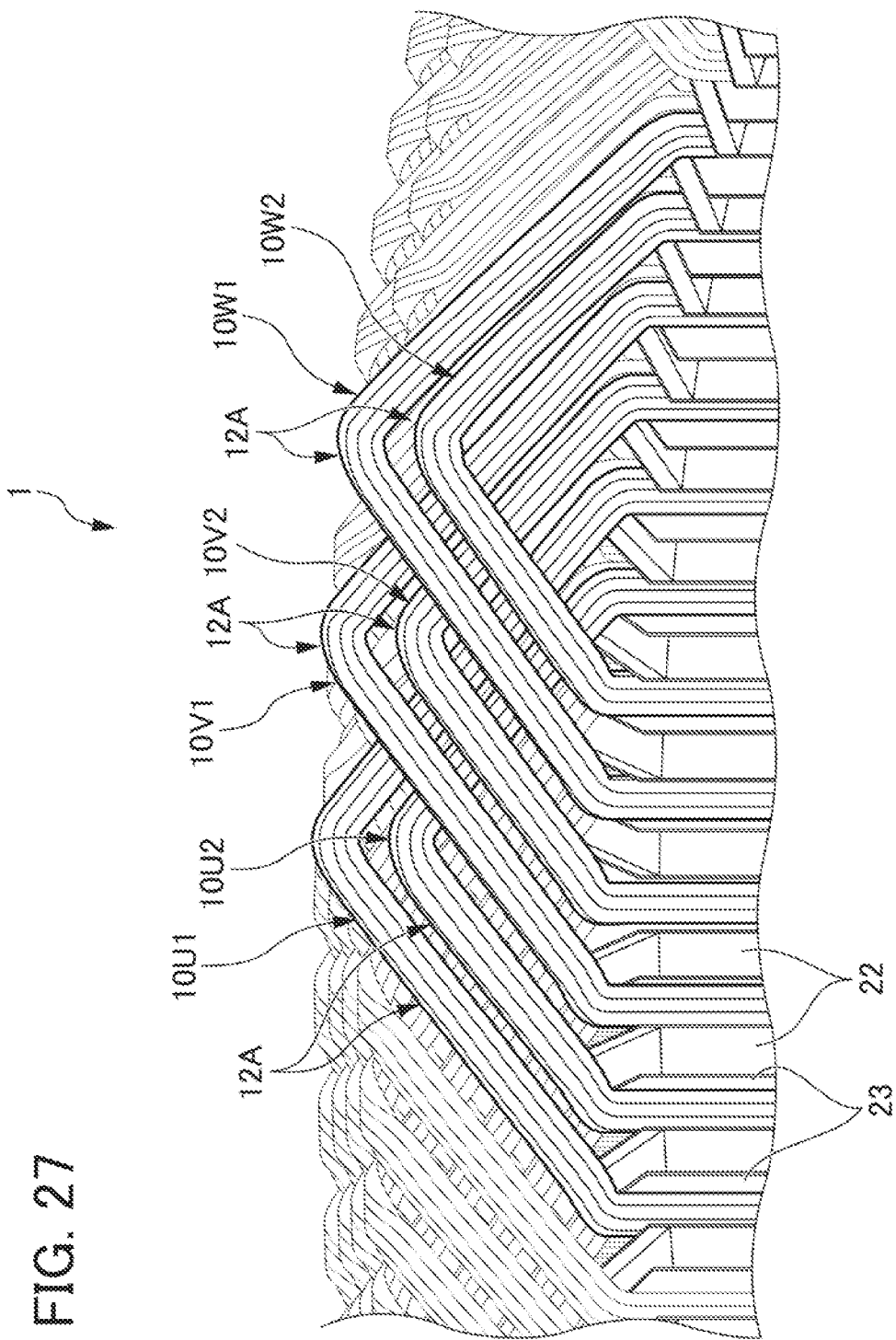
FIG. 27 is a view illustrating in an enlarged manner a part of a stator for a rotating electrical machine, after the wave winding coil is attached.

The wave winding coil 1 being formed is attached to the stator core 20, where the side, which is adjacent to the U-shaped parts 12A, of the continuous wires 10 (the continuous wires 10U1, 10U2, 10V1, 10V2, 10W1, and 10W2) are disposed on an innermost periphery side or an outermost periphery side. FIG. 27 illustrates a state when the wave winding coil 1 is attached to the stator core 20, where the side adjacent to the U-shaped parts 12A is disposed on the innermost periphery side, is seen from the inner periphery side of the wave winding coil 1. The U-shaped parts 12A disposed in the first layer 1T on the innermost periphery side of the wave winding coil 1 are keeping the transposition shapes illustrated in FIG. 8.

The six continuous wires 10 (the continuous wires 10U1, 10U2, 10V1, 10V2, 10W1, and 10W2) respectively belonging to the three phases are stacked to allow the straight parts 14 to be each offset by one slot. The configuration makes it possible to form in a single process the three-phase, wave winding coil 1 where two of the continuous wires 10 belong to one phase.

In addition, in the wave winding coil 1 formed by the wave winding coil forming machine 200, where forming of the inclined parts 15 and folding of the inclined parts 15 are alternately repeated, formation errors that may occur when the continuous wires 10 are folded are not accumulated in the inclined parts 15. Therefore, the forming accuracy for the slot disposition parts 11 and the turning parts 12 becomes satisfactory.

With the continuous wires 10, each wire of which, as described in the embodiment, the plurality of unit wire materials 10a are arranged in parallel to each other, it is also possible to achieve transposition in the U-shaped parts 12A of the unit wire materials 10a in even one of the continuous wires 10.

When the continuous wires 10 are formed from the plurality of unit wire materials 10a, it is inevitable that, when the inclined parts 15 are to be folded, a perimeter difference occurs among the unit wire materials 10a due to an angular difference between the extending directions and the folding direction of the inclined parts 15 before folding. If all inclined parts are formed beforehand, there is a problem that a perimeter difference that occurs, when folding, among the unit wire materials 10a affects the already formed inclined parts, causing shoulder bending parts of the formed inclined parts (points of origin at which the inclined parts are bent) to be displaced. However, alternately performing the inclined part forming step and the folding step as described in the embodiment makes it possible to substantially cancel out, through forming of the next inclined parts 15, the negative effects of a perimeter difference among the unit wire materials 10a to be folded. Therefore, even when the continuous wires 10 are each formed from the plurality of unit wire materials 10a arranged in the thickness directions, it is possible to manufacture the wave winding coil 1 with improved forming accuracy.

The sheet-shaped, wave winding coil 1 acquired as described above has a two-layer structure where the slot disposition parts 11 overlap with each other. The sheet-shaped, wave winding coil 1 further has, as illustrated in FIG. 1, the layer switching parts Ta at which the layers (turns) T switch in the radial directions of the stator core 20, each time the coil is wound on the stator core 20. To form the wave winding coil 1 as described above, and to prevent layers from coming into contact with each other in the layer switching parts Ta, in the folding step, the folding direction of the inclined parts 15 that correspond to the layer switching parts Ta, as described above, may be changed to a direction (an R2 direction) opposite to the folding direction (the R1 direction) to fold the inclined parts 15, as described below.

Figure 28:
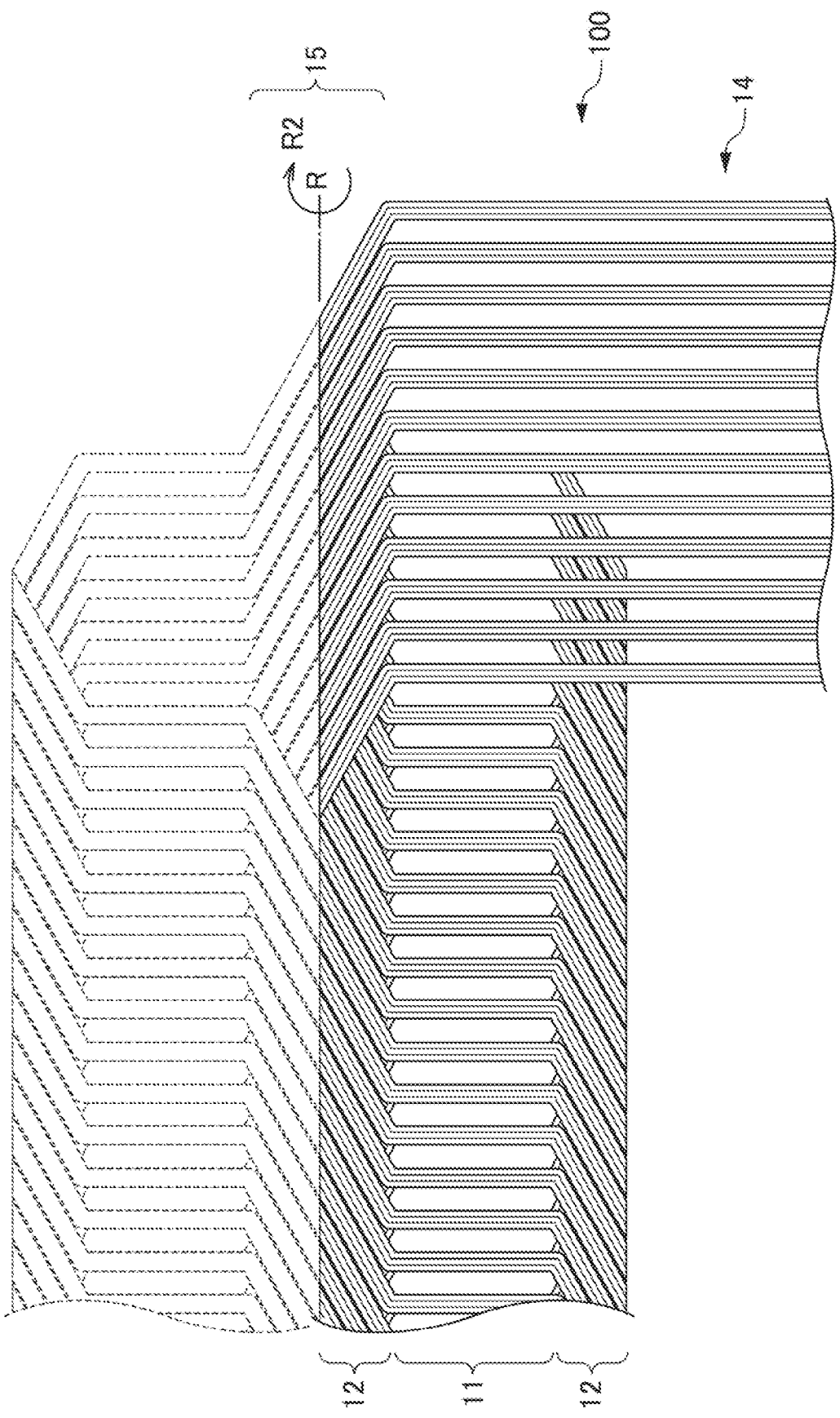
FIG. 28 is a plan view of the group of continuous wires, illustrating a situation where the inclined parts corresponding to layer switching parts are being folded back in an opposite direction.

As illustrated in FIG. 28, in the folding step where the inclined parts 15 corresponding to the layer switching parts Ta are folded along the folding line R, the inclined parts 15 are folded back in the opposite direction (the R2 direction) that is opposite to the folding direction (the R1 direction) of the inclined parts 15 in the previous folding step. That is, in the case of the wave winding coil 1 according to the embodiment, where, as illustrated in FIG. 1, the layer switching parts Ta are respectively present at a total of three locations, i.e., between the seventh layer (7T) and the sixth layer (6T), between the fifth layer (5T) and the fourth layer (4T), and between the third layer (3T) and the second layer (2T), the inclined parts 15 are folded back in the opposite direction only in the folding step for the inclined parts 15 corresponding to the layer switching parts Ta, as described above.

Figure 29:
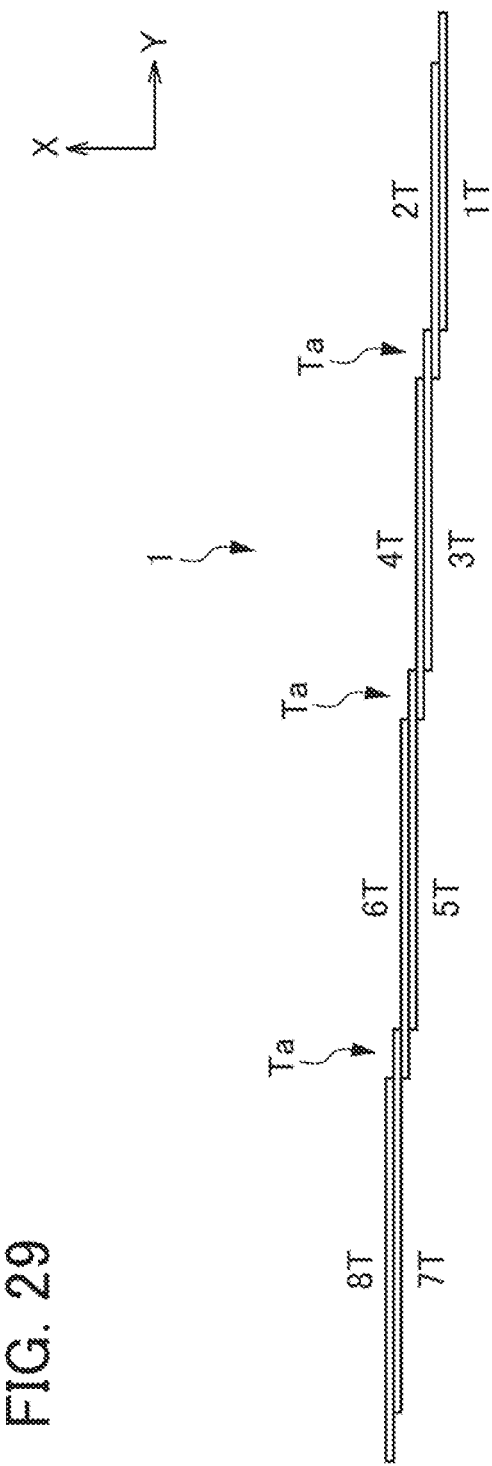
FIG. 29 is a plan view illustrating a sheet-shaped, wave winding coil formed from the group of continuous wires where the layer switching parts are folded back in the opposite direction.
Figure 30:
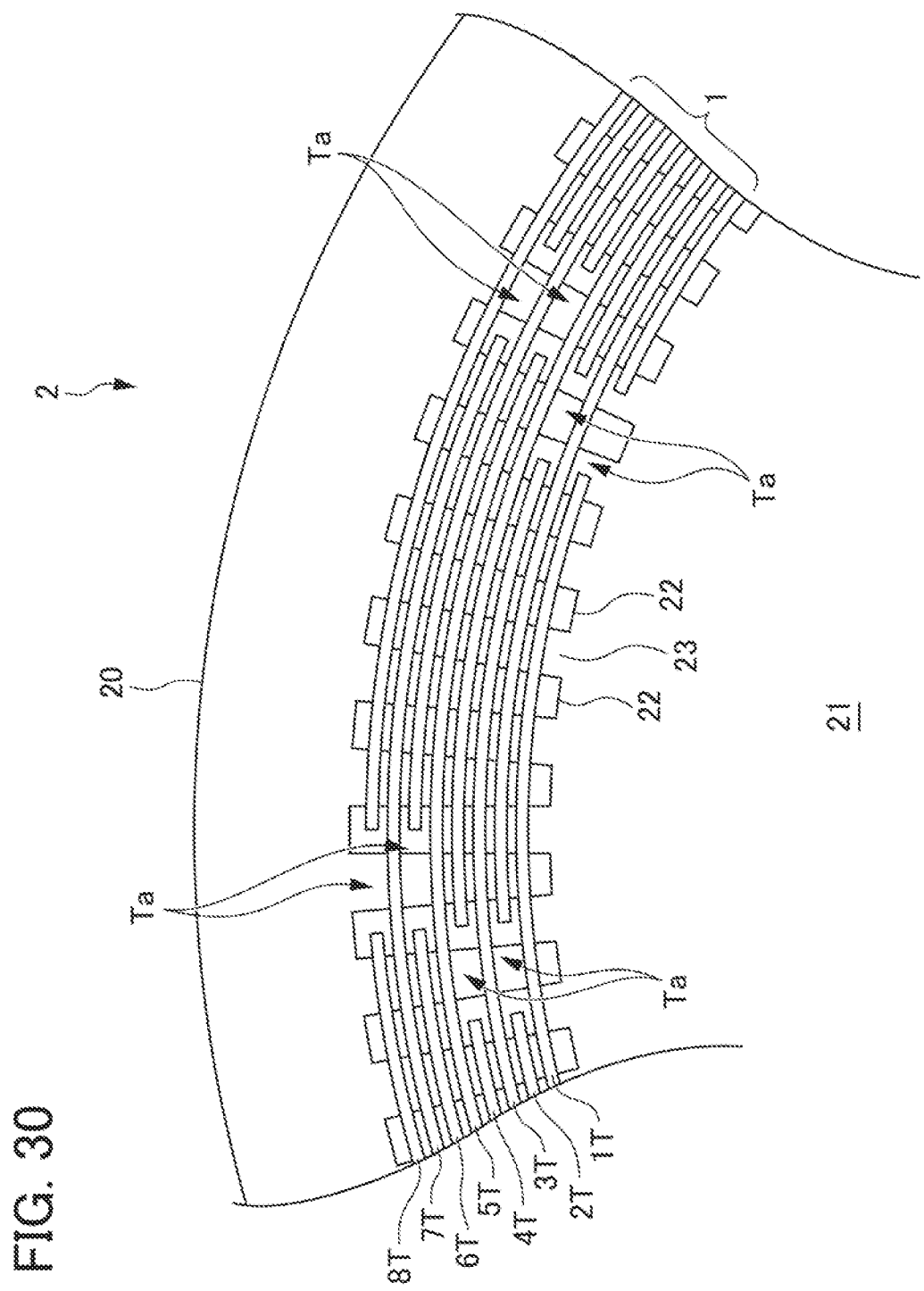
FIG. 30 is a plan view of a part in a state where the sheet-shaped, wave winding coil formed from the group of continuous wires where the layer switching parts are folded back in the opposite direction is attached to a stator core.

Therefore, as illustrated in FIG. 29, in the layer switching parts Ta, an offset direction along one of the thickness directions of the turning parts 12 (the radial directions of the stator core, and the X directions in FIG. 28) is reversed, making it possible, when the wave winding coil 1 is to be attached to the stator core 20, to prevent the layers T from coming into contact with each other in the layer switching parts Ta. Therefore, it is possible to form in a single process the wave winding coil 1 having a length corresponding to the four circumferential length of the stator core 20, where, even when the slot disposition parts 11 of the wave winding coil 1 are inserted into the slots 23 to attach the wave winding coil 1 to the stator core 20, there are no steps formed on the layer switching parts Ta, as illustrated in FIG. 30.

By the way, in a rotating electrical machine, such a phenomenon (ripple) of pulsing motions occurring when a rotor rotates due to an inter-phase torque fluctuation is known. Ripple may negatively affect vehicle ride comfort, when a rotating electrical machine is used as a travel motor for a vehicle such as a hybrid electric vehicle or an electric vehicle. To solve this problem, it is known that a phase between layer coils adjacent to each other is displaced by one slot in radial directions of a stator core to smooth an inter-phase torque fluctuation to reduce the ripple.

Figure 31:
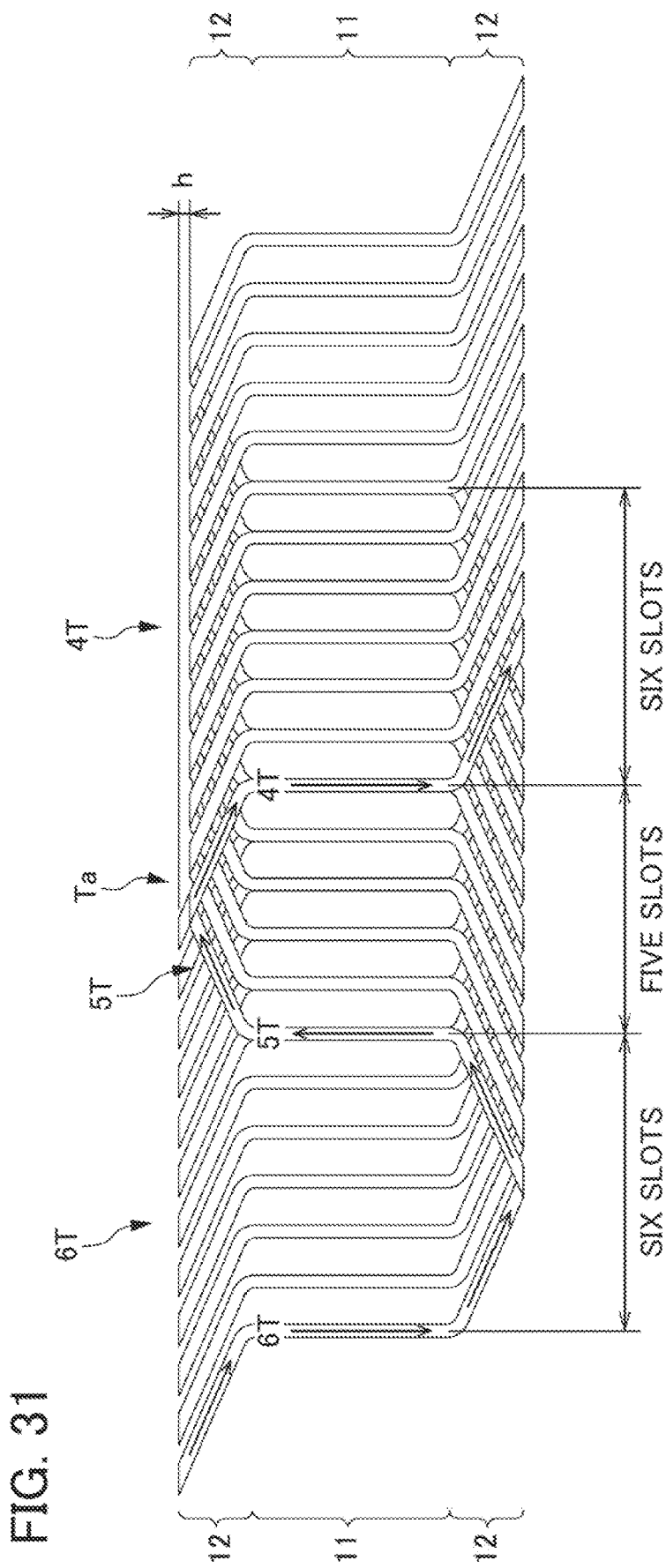
FIG. 31 is a front view illustrating a pitch between the slot disposition parts of the layer switching parts in a fourth layer and a fifth layer in the wave winding coil.

FIG. 31 illustrates a state, in the wave winding coil 1 according to the embodiment, a slot pitch of the wave winding coil 1 is partially displaced and shortened by one slot for reducing the ripple. In here, an example, where a slot pitch is displaced and shortened by one slot at an intermediate portion of the wave winding coil 1 including 1T to 8T, i.e., between 4T and 5T, is illustrated.

Specifically, a slot pitch of the continuous wires 10 respectively belonging to the phases in the layers T in the wave winding coil 1 normally corresponds to a six-slot-worth pitch. For example, when focused on the U phase, as illustrated in FIG. 8, the straight part 14 belonging to the identical U phase, which is disposed, in the Y directions, adjacent to the straight part 14 of the continuous wire 10U1, which is disposed on the most left end in FIG. 8, is the straight part 14 of the continuous wire 10U2, which is separated by a six-slot-worth pitch. However, in the wave winding coil 1 according to the embodiment, as illustrated in FIG. 31, the slot disposition parts 11 are folded at a five-slot-worth pitch only at the layer switching part Ta between 4T and 5T. More specifically, in the folding step, where folding takes place backwardly in the opposite direction, for the layer switching part Ta between 4T and 5T, the folding takes place to reduce a height of each of the turning parts 12 by a height h, compared to the folding at a six-slot-worth pitch.

Figure 32:
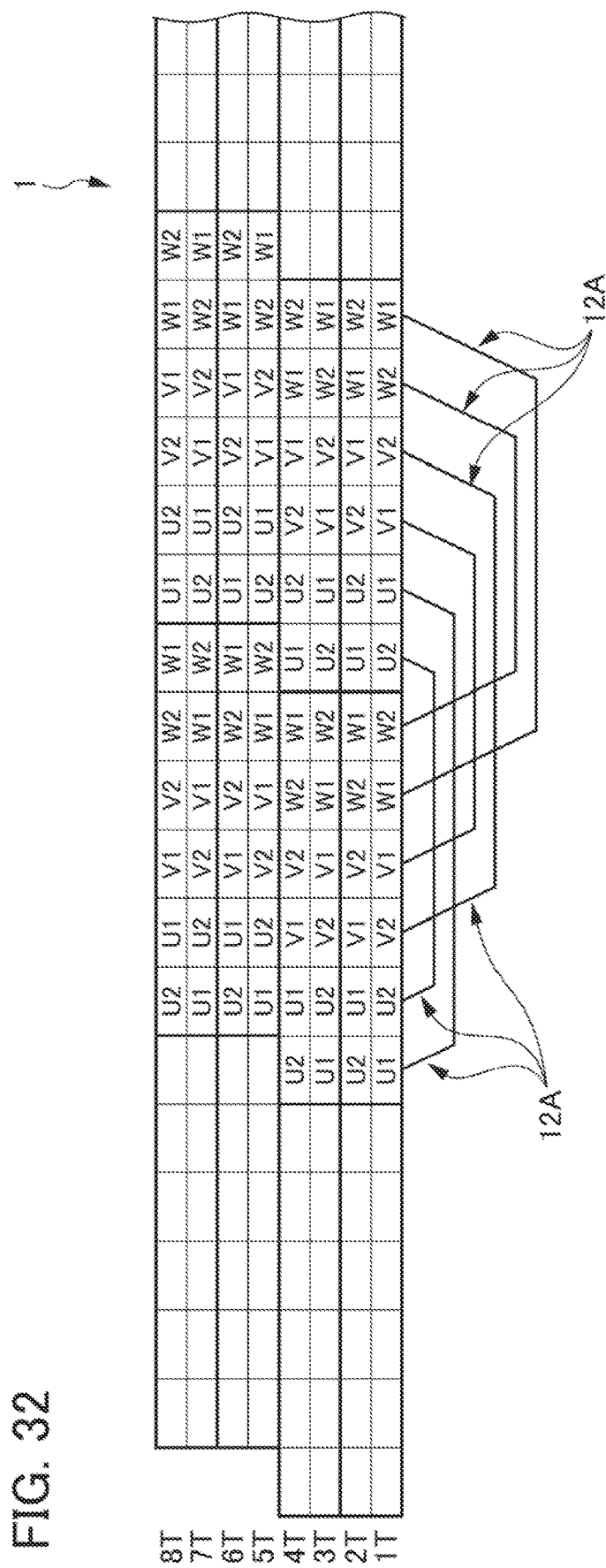
FIG. 32 is a view schematically illustrating the wave winding coil where phases are each displaced by one slot between the fourth layer and the fifth layer.

Therefore, it is possible, as illustrated in FIG. 32, to cause only one slot pitch between 4T and 5T of the wave winding coil 1 to be displaced and shortened for all the phases, i.e., the three phases of U, V and W. Therefore, it is possible to suppress ripple from occurring while a rotating electrical machine is rotating to allow the rotating electrical machine to smoothly rotate.

It is enough that a portion where a slot pitch is displaced and shortened by one slot, as described above, is present on at least one of the layer switching parts Ta in the wave winding coil 1. In the embodiment, it has been configured that a slot pitch is shortened by one slot. However, a slot pitch may be extended by one slot.

The wave winding coil 1 described above has been configured and arranged with the six continuous wires 10 in parallel to each other. However, the number of the continuous wires 10 arranged in parallel to each other is not limited to six. The number may be appropriately increased or reduced. The continuous wires 10 have each been configured where the three unit wire materials 10a are arranged in parallel to each other. However, the number of the unit wire materials 10a is not limited to three. The number may also be appropriately increased or reduced.

EXPLANATION OF REFERENCE NUMERALS

1 Wave winding coil
10 Continuous wire
10a Unit wire material
11 Slot disposition part
12 Turning part
12A U-shaped part
12c Apex part
14 Straight part
15 Inclined part
2 Stator
20 Stator core 23 Slot
T Layer
Ta Layer switching part

What is claimed is:

1. A method of manufacturing a wave winding coil formed from continuous wires, the wave winding coil having a plurality of slot disposition parts configured to be disposed in slots of a stator core and turning parts each coupling the slot disposition parts adjacent to each other, the continuous wires respectively having U-shaped parts each formed into a U-shape and pairs of straight parts extending from the U-shaped parts, the method comprising:

a transposition shape forming step of forming transposition shapes in each of which, among at least two of the continuous wires belonging to an identical phase, the U-shaped part of one of the continuous wires is disposed inside the U-shaped part of another one of the continuous wires;

an inclined part forming step of causing the respective pairs of straight parts of the at least two of the continuous wires respectively formed with the transposition shapes to be offset in a direction that intersects extending directions of the pairs of straight parts and that is orthogonal to thickness directions of the U-shaped parts to form inclined parts on the at least two of the continuous wires; and a folding step of folding the at least two of the continuous wires after forming the inclined parts formed by the inclined part forming step, at portions of the inclined parts, the portions corresponding to apex parts of the turning parts, to form the turning parts and the slot disposition parts, wherein the plurality of transposition shapes are disposed in a stacked manner to dispose each of the pairs of straight parts of the continuous wires in an identical one of the slots, and the inclined part forming step and the folding step are alternately performed on the plurality of transposition shapes, and wherein the wave winding coil is a wave winding coil where, when the wave winding coil is attached in a winding manner inside the slot of the stator core, a plurality of layers are formed on the stator core, and, in the folding step, a folding direction of the inclined parts is reversed at layer switching parts where the layers each switch in a diameter direction of the stator core.

2. The method of manufacturing the wave winding coil, according to claim 1, wherein the continuous wires are each formed from at least two unit wire materials that are stacked in the direction that intersects the extending directions of the pairs of straight parts and that is orthogonal to the thickness directions of the U-shaped parts, and, the U-shaped parts are each formed such that a U-shape of one of the at least two unit wire materials is disposed inside a U-shape of another one of the at least two unit wire materials without changing a stacking order of the at least two unit wire materials constituting each of the continuous wires.

3. The method of manufacturing the wave winding coil, according to claim 1, wherein, in the folding step, folding takes place to allow a slot pitch of the wave winding coil to be manufactured to be displaced and shortened by one slot at least one of the layer switching parts.

* * * * *